(12) United States Patent
Hyoudou

(10) Patent No.: US 11,880,724 B2
(45) Date of Patent: *Jan. 23, 2024

(54) INFORMATION PROCESSING APPARATUS FOR CONTROLLING DATA TRANSFERRING AND METHOD OF PROCESSING INFORMATION FOR CONTROLLING DATA TRANSFERRING

(71) Applicant: FUJITSU LIMITED, Kawasaki (JP)

(72) Inventor: Kazuki Hyoudou, Chofu (JP)

(73) Assignee: FUJITSU LIMITED, Kawasaki (JP)

( * ) Notice: Subject to any disclaimer, the term of this patent is extended or adjusted under 35 U.S.C. 154(b) by 100 days.

This patent is subject to a terminal disclaimer.

(21) Appl. No.: 17/225,171

(22) Filed: Apr. 8, 2021

(65) Prior Publication Data

US 2022/0029914 A1 Jan. 27, 2022

(30) Foreign Application Priority Data

Jul. 22, 2020 (JP) .................................. 2020-124948
Dec. 3, 2020 (JP) .................................. 2020-201211

(51) Int. Cl.
*G06F 9/54* (2006.01)
*H04L 45/42* (2022.01)
*G06F 9/455* (2018.01)

(52) U.S. Cl.
CPC .......... *G06F 9/544* (2013.01); *G06F 9/45558* (2013.01); *H04L 45/42* (2013.01);
(Continued)

(58) Field of Classification Search
CPC ................. G06F 9/544; G06F 9/45558; G06F 2009/45579; G06F 2009/45583
See application file for complete search history.

(56) References Cited

U.S. PATENT DOCUMENTS

2011/0202920 A1* 8/2011 Takase ................ G06F 9/45558
718/1
2012/0195187 A1 8/2012 Ashihara et al.
(Continued)

FOREIGN PATENT DOCUMENTS

JP 2011-81588 A 4/2011
JP 2015-62282 A 4/2015
(Continued)

*Primary Examiner* — Kevin L Young
*Assistant Examiner* — Carina Yun
(74) *Attorney, Agent, or Firm* — Fujitsu Patent Center

(57) ABSTRACT

An apparatus includes: a storing device including regions allocated one to each of virtual machines; a processing device, connected to the storing device, that executes the virtual machines; a relay device, connected to the processing device, that executes a relaying process, serving as a virtual switch that connects the virtual machines to one another; and a transfer processor that transfers data between the regions through the processing device. The relay device obtains, from a first region, a first fragment data of target data being stored in the first region and indicating a destination of the target data, and outputs, when the destination is a second region, an instruction instructing the transfer processor to transfer the target data from the first region to the second region. The transfer processor transfers the target data from the first region to the second region through the processing device in response to the instruction.

20 Claims, 25 Drawing Sheets

(52) U.S. Cl.
CPC .......... *G06F 2009/4557* (2013.01); *G06F 2009/45579* (2013.01); *G06F 2009/45583* (2013.01)

(56) References Cited

U.S. PATENT DOCUMENTS

| | | | |
|---|---|---|---|
| 2014/0064056 A1* | 3/2014 | Sakata | H04L 41/0816 |
| | | | 370/216 |
| 2014/0286338 A1* | 9/2014 | Kurita | H04L 49/70 |
| | | | 370/392 |
| 2015/0370586 A1 | 12/2015 | Cooper et al. | |
| 2016/0191385 A1* | 6/2016 | Lopez | H04L 67/63 |
| | | | 370/392 |
| 2016/0232072 A1 | 8/2016 | Skerry et al. | |
| 2019/0109765 A1 | 4/2019 | Shibata et al. | |
| 2019/0129873 A1* | 5/2019 | Zhao | G06F 13/20 |
| 2019/0132252 A1* | 5/2019 | Hyoudou | H04L 47/2483 |
| 2019/0280980 A1 | 9/2019 | Hyoudou | |
| 2020/0089525 A1 | 3/2020 | Kobayashi et al. | |

FOREIGN PATENT DOCUMENTS

| | | |
|---|---|---|
| JP | 2016-9486 A | 1/2016 |
| JP | 2018-133758 A | 8/2018 |
| JP | 2019-161319 A | 9/2019 |
| JP | 2020-048045 A | 3/2020 |
| WO | 2017/170312 A1 | 10/2017 |

* cited by examiner

INFORMATION PROCESSING APPARATUS FOR CONTROLLING DATA TRANSFERRING AND METHOD OF PROCESSING INFORMATION FOR CONTROLLING DATA TRANSFERRING

CROSS-REFERENCE TO RELATED APPLICATION

This application is based upon and claims the benefit of priority of the prior Japanese Patent Application No. 2020-124943, filed on Jul. 22, 2020, and the Japanese Patent Application No. 2020-201211, filed on Dec. 3, 2020, the entire contents of which are incorporated herein by reference.

FIELD

The present invention relates to an information processing apparatus, a computer-readable recording medium having stored therein an information processing program, and a method for processing information.

BACKGROUND

Network Function Virtualization (NFV) is known as a technique that implements a network function, which has been achieved by a dedicated device, by means of the software on a general-purpose information processing apparatus. The NFV activates multiple Virtual Network Functions (VNFs) on a single information processing apparatus through the use of a technique of virtualization of the information processing apparatus and thereby connects a VNF to a VNF or to an external network (NW), using a virtual switch, for example. Here, a VNF is executed, for example, in a virtual machine (VM) that information processing apparatus executes.

In a NFV, communication in the information processing apparatus, i.e., the host, is greatly increased due to, for example, service chain as compared with a conventional virtualization environment, which makes the relaying performance of the virtual switch crucial. However, a virtual switch implemented by software has a large variation in processing delay and processing time and is sometimes difficult to satisfy the performance required for an NFV. In addition, a software-implemented virtual switch causes heavy loads on a processor (processing device) in packet relaying, which may result in wasting the processing resources that the processor provides to applications.

As a solution to the above, the relaying function of the virtual switch is offloaded to hardware of a communication device (relay device) such as a Network Interface Card (NIC). Examples of the hardware such as an NIC include a Field Programmable Gate Array (FPGA)-NIC, or a smart NIC. An FPGA-NIC is a NIC equipped with an FPGA and achieves the relaying function of a virtual switch by means of FPGA. In addition, a smart NIC is a programmable NIC, which achieves the relaying function of a virtual switch by means of a program.

[Patent Document 1] Japanese Laid-open Patent Publication No. 2019-161319
[Patent Document 2] International Publication Pamphlet No. WO 2017/170312
[Patent Document 3] Japanese Laid-open Patent Publication No. 2018-133758
[Patent Document 4] Japanese Laid-open Patent Publication No. 2020-048045

In a software implemented virtual switch, communication within the host exemplified by memory copying between VMs is performed through a processor implementing the virtual switch without passing through the NIC.

As illustrated in FIG. 1, for example, in a server 100 serving as an example of a host in a virtual environment, communication between a memory 121 of a VM #0 and a memory 122 of a VM #1 in a host memory 120 passes through a virtual switch 111 by means of software of a processor 110 (see the reference symbol A). On the other hand, as illustrated in the reference symbol B, communication between the memory 122 of the VM #1 and an external NW passes through the virtual switch 111 and a Network Interface Card (NIC) 130.

However, when the relaying function of the virtual switch is offloaded to hardware, in the host, the communication data of both communication within the host and communication outside the host is transferred via the hardware to be offloaded.

For example, as illustrated in FIG. 2, in a server 200 serving as an example of a host in a virtual environment, the relaying function is offloaded to hardware, and an NIC 230 serving as an FPGA-NIC or a smart NIC is provided with a virtual switch 231. In the example of FIG. 2, communication between a memory 221 of a VM #0 and a memory 222 of a VM #1 in a host memory 220 passes through a processor 210 and the virtual switch 231 of the NIC 230 (see the reference symbol C). Also as illustrated in reference symbol D, communication between the memory 222 and an external NW also passes through the processor 210 and the virtual switch 231.

As the above, an I/O (Input/Output) bus band (see the reference symbol E) of the NIC 230 to be offloaded is shared among all communications occurring in the server 200. For example, since some I/O bus band may be about one tenth of the memory band of the host 200, the I/O bus band may become a bottleneck by offloading the relaying process to the NIC 230.

SUMMARY

According to an aspect of the embodiments, an information processing apparatus includes: a storing device including a plurality of storing regions allocated one to each of a plurality of virtual machines; a processing device that is connected to the storing device and that executes the plurality of virtual machines; a relay device that is connected to the processing device and that executes a relaying process, serving as a virtual, switch that connects the plurality of virtual machines to one another; and a transfer processor that transfers data between the plurality of storing regions through the processing device. The relay device obtains, from a first region among the plurality of storing regions, a first fragment data of transmission target data stored in the first storing region, the first fragment data indicating a destination of the transmission target data, and outputs, in a case where the destination of the first fragment data is a second storing region among the plurality of storing regions, an instruction instructing the transfer processor to transfer the transmission target data from the first storing region to the second storing region, to the transfer processor. The transfer processor transfers the transmission target data from the first storing region to the second storing region through the processing device in response to the instruction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
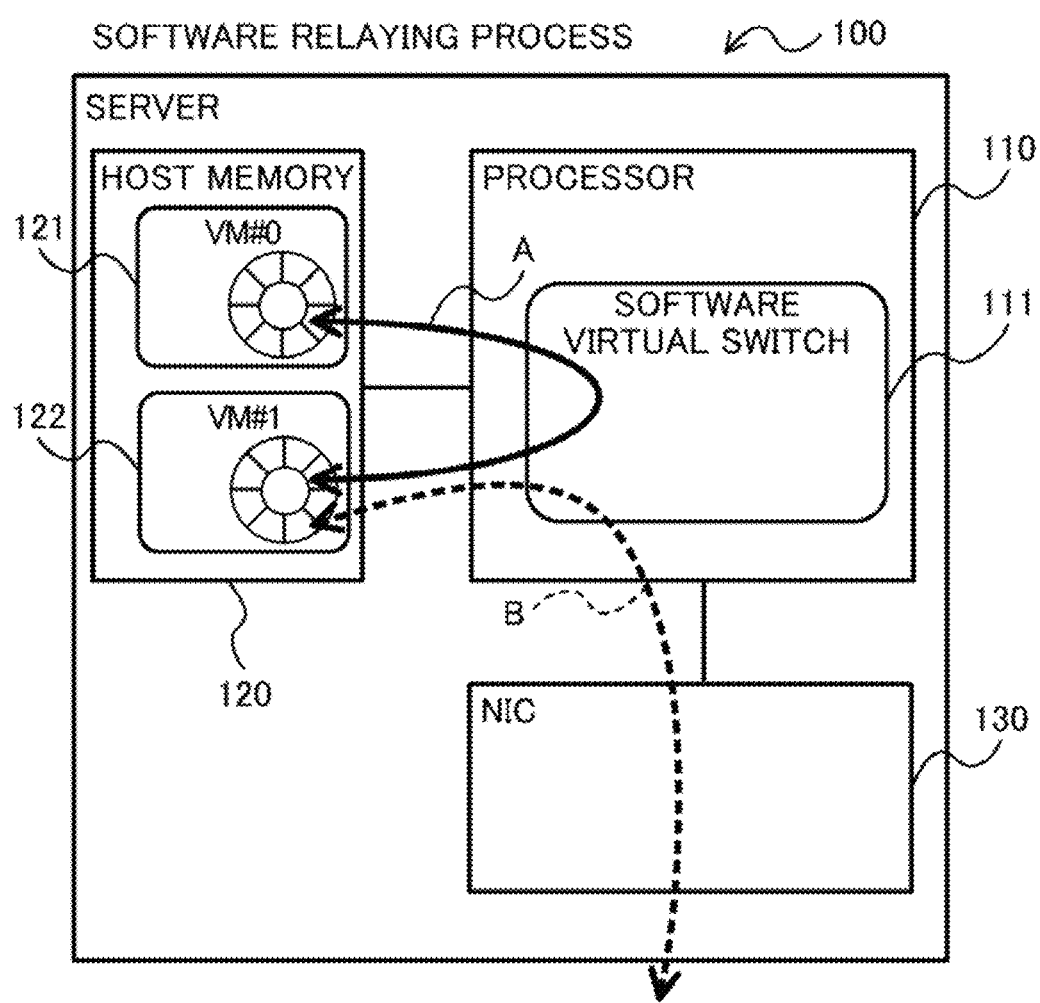
FIG. 1 is a diagram illustrating an example of a software relaying process.
Figure 2:
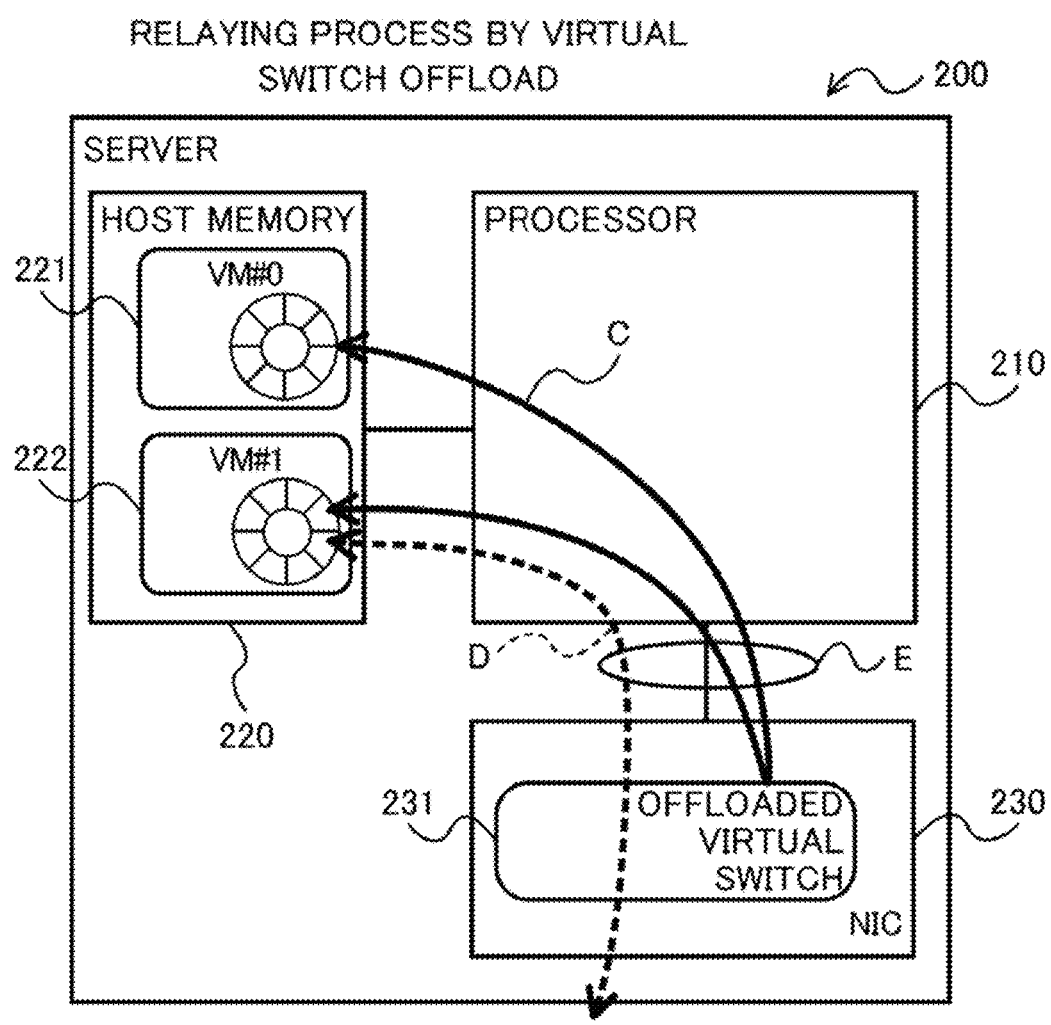
FIG. 2 is a diagram illustrating an example of a relaying process by virtual switch offloading.

Hereinafter, embodiments of the present invention will now be described with reference to the accompanying drawings. However, the embodiments described below are merely illustrative and are not intended to exclude the application of various modifications and techniques not explicitly described below. For example, the present embodiment can be variously modified and implemented without departing from the scope thereof.

In the drawings to be used in the following description, like reference numbers designate the same or substantially same parts and elements, unless otherwise specified.

[1] First Embodiment

Figure 3:
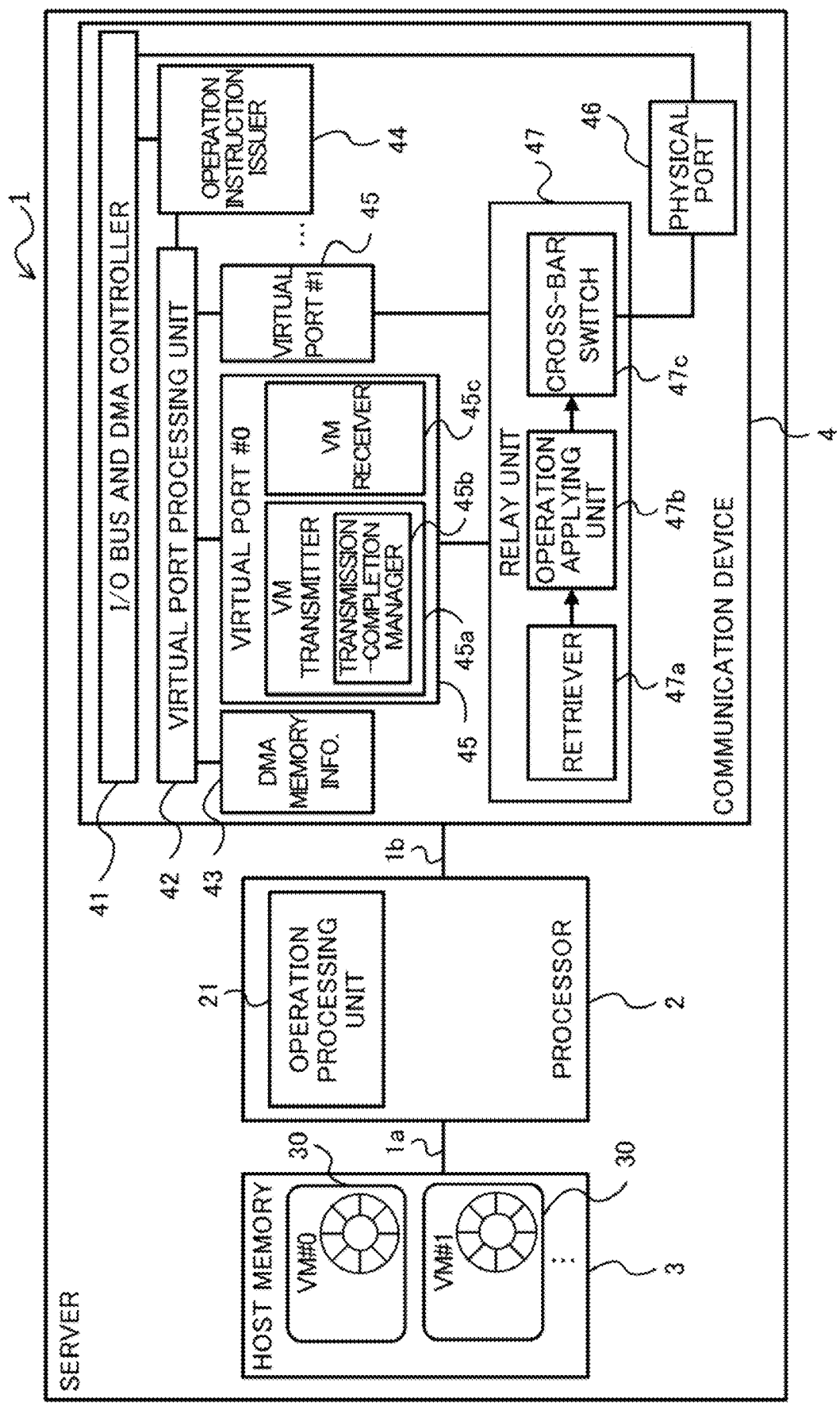
FIG. 3 is a block diagram schematically illustrating an example of the configuration of a server according to a first embodiment.

[1-1] Example of Configuration of Server:

FIG. 3 is a block diagram schematically illustrating an example of the configuration of a server 1 according to a first embodiment. The server 1 according to the first embodiment is an example of an information processing apparatus or a computer, and as illustrated in FIG. 3, may exemplarily include a processor 2, a host memory 3, and a communication device 4. Incidentally, the server 1 may include two or more communication devices 4.

The processor 2 is an integrated circuit (IC) that performs various controls and arithmetic operations in the server 1, and is an example of a processing device, or an arithmetic operation processing device.

The processor 2 may be a multi-core processor including multiple cores or a multi-processor including multiple processors. Examples of the processor 2 may be any one of integrated circuits such as a Central Processing Unit (CPU), a Micro Processing Unit (MPU), a Graphics Processing Unit (GPU), a Digital Signal Processor (DSP), an Application Specific Integrated Circuit (ASIC), and a Programmable Logic Device (PLD) (e.g., Field Programmable Gate Array (FPGA)), or a combination of two or more of these integrated circuits.

In the first embodiment, the processor 2 is assumed to be connected to the host memory 3 and to execute multiple virtual machines (VMs) #0 and #1 using at least a part of the storing region of the host memory 3.

The processor 2 may also include an operation processing unit 21 that operates the host memory 3 in response to an instruction from the communication device 4. In the first embodiment, the operation processing unit 21 is a module independent of the communication device 4 to which the relaying function is offloaded from the processor 2, and is a module that can be controlled from the same communication device 4. Examples of operations on the host memory 3 include inter-buffer data copying in the host memory 3 through the processor 2, updating of the process-completion indexes of transmission and reception queues.

The host memory 3 may include a storing region for storing a program and data executed by the processor 2. An example of the hosted memory 3 may be a volatile memory, such as a Dynamic Random Access Memory (DRAM).

The host memory 3 according to the first embodiment may include a memory 30 for VMs. In the example of FIG.

3, the host memory 3 includes a memory 30 of the VM #0 and a memory 30 of the VM #1.

In other words, the host memory 3 is an example of a storing device having multiple storing regions allocated one to each of the multiple virtual machines. The operation processing unit 21 is an example of a transfer processor that transfers data between multiple memories 30 through the processor 2.

The memory 30 may store various data to be used to execute the VM, which data is exemplified by a program of a virtual Operating System (OS), control data, and data. Each memory 30 may be, for example, a portion of the storing region of the host memory 3 and, for example, may be allocated, as a ring buffer, to a VM.

The communication device 4 is a device that carries out communication and is an example of a programmable communication device exemplified by an NIC, such as an FPGA-NIC or a smart NIC. To the communication device 4 of the first embodiment, a virtual switch may be offloaded.

As the above, the communication device 4 is an example of a relay device that is connected to the processor 2 and executes a relaying process, serving as a virtual switch that connects multiple VMs to one another.

The processor 2 and the host memory 3 may be communicably connected to each other via a memory bus 1a. The processor 2 and the communication device 4 may be communicably connected to each other via an I/O bus 1b. The I/O bus 1b is an example of an input and output bus.

Figure 4:
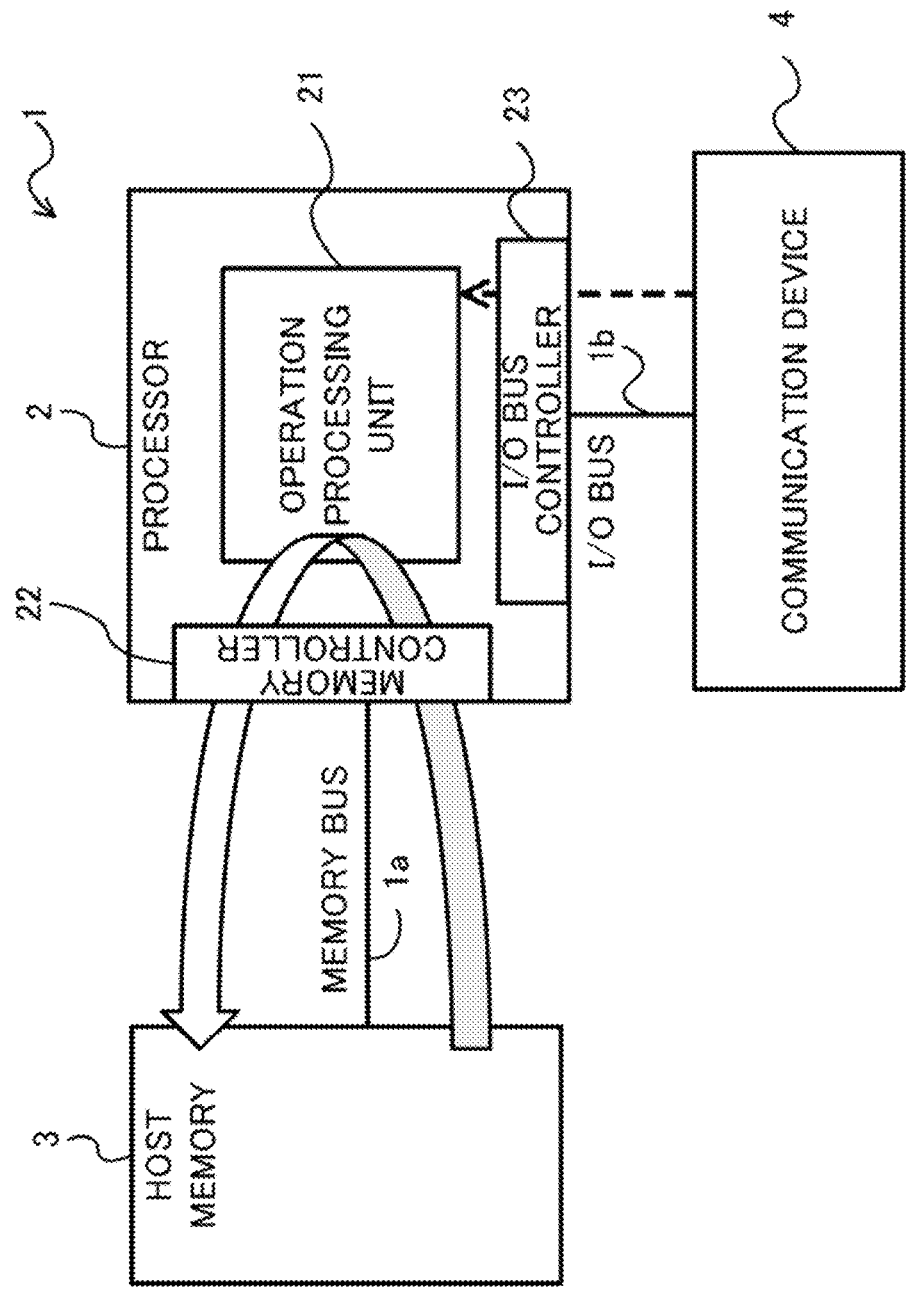
FIG. 4 is a diagram illustrating an example of connecting an operation processing unit, a host memory, and a communication device according to the first embodiment.
Figure 5:
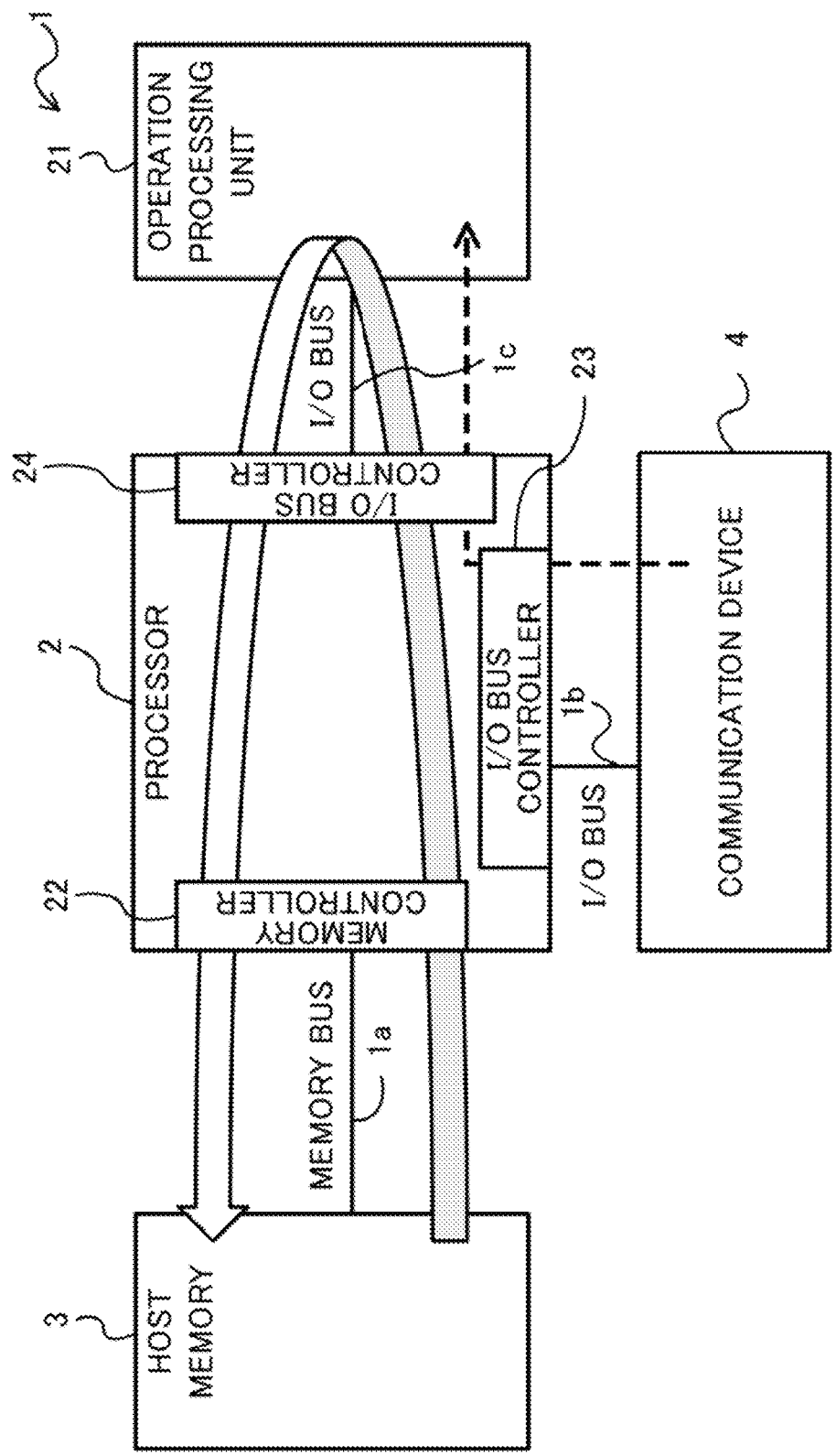
FIG. 5 is a diagram illustrating an example of connecting the operation processing unit, the host memory, and the communication device according to the first embodiment.

FIGS. 4 and 5 are diagrams illustrating examples of connecting the operation processing unit 21, the host memory 3, and the communication device 4.

In the first embodiment illustrated in FIG. 4, the operation processing unit 21 may be implemented in the server 1 serving as one of the functions of the processor 2. In other words, the processor 2 may include the operation processing unit 23. In this case, the operation processing unit 21 may then be implemented as software executed by the processor 2 or as a hardware function in the processor 2. In the example of FIG. 4, the operation processing unit 21 may communicate with the host memory 3 via the memory controller 22 provided in the processor 2 (or the server 1) and the memory bus 1a. The operation processing unit 21 may communicate also with the communication device 4 via the I/O bus controller 23 provided in the processor 2 (or the server 1) and the I/O bus 1b.

In the second embodiment illustrated in FIG. 5, the operation processing unit 21 may be implemented in the server 1 as an I/O device independent of the communication device 4. For example, the communication device 4 is connected to the processor 2 via the I/O bus 1b that is an example of the first input and output bus, and the operation processing unit 21 is connected to the processor 2 via an I/O bus 1c that is an example of a second input and output bus that is different from the first input and output bus.

In the example of FIG. 5, the operation processing unit 21 may communicate with the processor 2 (also with the host memory 3 and the communication device 4) via the I/O bus controller 24 provided in the processor 2 (or the server 1) and the I/O bus 1c. In the second example illustrated in FIG. 5, since the operation processing unit 21 does not share the I/O bus 1b with the communication device 4, degradation in communication performance in the I/O bus 1b on the side of the communication device 4 can be reduced.

Returning to the description of FIG. 3, the communication device 4 may illustratively includes an I/O bus and Direct Memory Access (DMA) controller 41, a virtual port processing unit 42, a DMA memory information 43, an operation instruction issuer 44, a virtual port 45, a physical port 46, and a relay unit 47.

The I/O bus and DMA controller 41 may include an I/O bus controller that controls the I/O bus 1b and a DMA controller that controls DMA to the memory region of the VM, e.g., to the memory 30.

The virtual port processing unit 42 accesses the memory 30 via the I/O bus and DMA controller 41, using the DMA memory information 43 provided, for the virtual port 45.

In accessing the memory 30, the virtual port processing unit 42 of the first embodiment may perform reading and writing of a header fragment used for Forwarding Information Base (FIB) retrieval in place of performing reading and writing of data, for example, the entire packet. The FIB retrieval is an example of a retrieval method that retrieves the destination of a packet from a packet header. The header fragment may be, for example, several tens of bytes of the beginning of the packet.

Further, the virtual port processing unit 42 according to the first embodiment may execute transmitting and receiving of an entire packet by issuing an instruction to the operation processing unit 23 via the operation instruction issuer 44.

The DMA memory information 43 is information to be used to make DMA to the memory 30 associated with the virtual port 45. For example, the DMA memory information 43 may be provided for each virtual port 45. The DMA memory information 43 may be stored in, for example, a storing region of a storing element such as a memory or a register included in the communication device 4.

The operation instruction issuer 44 issues a command to the operation processing unit. 21 on the basis of an instruction from the virtual port processing unit 42. The operation processing unit 21, for example, in response to the command from operation instruction issuer 44, performs the operations described above on the host memory 3.

The virtual port 45 is a virtual port being connected to a VM that the processor 2 executes by using the memory 30, and being used to communicate with the VM. In FIG. 3, a virtual port 45 connected to the VM #0 that the processor 2 executes is represented by a virtual port #0, and a virtual port 45 connected to the VM #1 that the processor 2 executes is represented by a virtual port #1.

The virtual port 45 may include a VM transmitter 45a, a transmission-completion manager 45b, and a VM receiver 45c.

The VM transmitter 45a performs processing relating to a packet sent from the VM, in other words, a packet to be received (relayed) by the communication device 4. The VM receiver 45c performs processing relating to a packet received by the VM, in other words, a packet, to be transmitted (relayed) by the communication device 4.

The VM transmitter 45a may include a transmission-completion manager 45b. The transmission-completion manager 45b manages by which process in the transmission queue of the VM have been completed. As described above, since the communication device 4 reads the header fragment instead of reading the entire packet, it is difficult to determine whether or net the packet has been processed by referring only to the transmission queue of the VM. As a solution to the above, the transmission-completion manager 45b notifies the operation instruction issuer 44 at the timing (time point) when a process-completion index can be updated by management to be described below.

The physical port 46 is one that is connected to an external interface (I/F) for communicating with an external NW or an external device disposed outside the server 1.

The virtual port 45 and the physical port 46 may each have a Port Identifier (PID) unique to each individual port. The PIDs may be unique to the virtual port 45 and the physical port 46 in one or more communication devices 4 provided, in the server 1. Even when the server 1 includes two or more communication devices 4, setting a PID such that, for example, higher-order several bits thereof indicate the ID of a communication device 4 and the lower-order several bits thereof indicate the ID of the port in the communication device 4 makes it possible to identify the input port and the output port with reference to the PID.

The relay unit 47 performs a relaying process on an input packet and outputs the packet to a destination port. For example, the relay unit 47 may include a retriever 47a, an operation applying unit 47b, and a cross bar switch 47c.

The retriever 47a performs an FIB retrieval, using information of an input packet.

The operation applying unit 47b determines an action suitable for an input packet and applies the determined action to the cross-bar switch 47c. An "action" may include, for example, rewriting of a header in addition to determining of a destination port.

The cross-bar switch 47c outputs the input packet to a destination port after the operation applying unit 47b applies the action thereto. The relay unit 47 may be achieved by various known methods, for example, the method described in Patent Document 1 described above.

Figure 6:
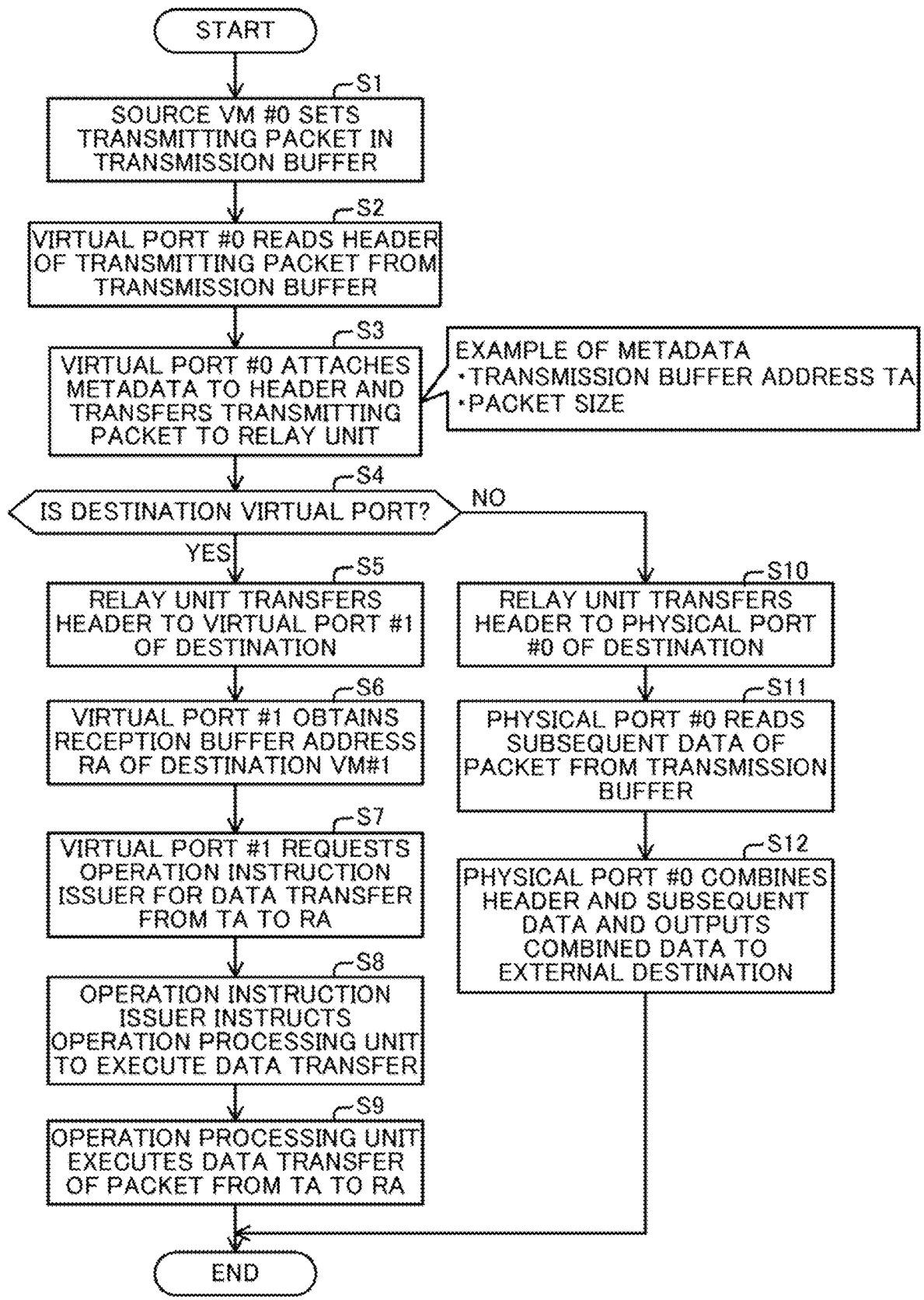
FIG. 6 is a flowchart illustrating an example of an action of a data transferring process in the server of the first embodiment.

[1-2] Example of Action in Data Transferring Process:

Next, description will now be made in relation to an example of an action in a data transferring process performed in the server 1 illustrated in FIG. 3 with reference to FIG. 6. FIG. 6 is a flowchart illustrating an example of an action of a data transferring process in the server 1.

The following description assumes a case where, in the server 1 illustrated in FIG. 3, data in the memory 30 of the VM #0 is transferred (transmitted) to the memory 30 of the VM #1, and a case where data in the memory 30 of the VM #0 is transferred (transmitted) to the outside of the server 1.

Hereinafter, the VM #0 serving as a transmission source is sometimes referred to as the "transmission source (hereinafter simply referred to "source") VM #0", and the memory 30 of the transmission source VM #0 is sometimes referred to as a "transmission source memory (hereinafter simply referred to "source memory") 30". Also, the VM #1 serving as a destination is sometimes referred to as the "transmission destination (hereinafter simply referred to "destination") VM #1", and the memory 30 of the destination VM #1 is sometimes referred to as a "transmission destination memory (hereinafter simply referred to "destination memory") 30".

The source VM #0 is an example of a first virtual machine, and the destination VM #1 is an example of a second virtual machine. Further, the source memory 30 is an example of a first storing region, and the destination memory 30 is an example of a second storing region.

As illustrated in FIG. 6, the source VM #0 sets a transmitting packet, which is an example of the transmission target data, to in a transmission buffer of the source memory 30 (Step S1).

The virtual port #0 connected to the source memory 30 obtains, by reading, for example, the header of the transmitting packet that is to be used for a determining process performed by the relay unit 47 from a transmission buffer of the source memory 30 (Step S2). The header is an example of a first fragment data indicating the destination of the transmission target data.

The virtual port #0 attaches metadata including a transmission buffer address TA and the packet size of a transmitting packet to the read header and transfers the header to the relay unit 47 (Step S3). The metadata is an example of second data. The transmission buffer address TA is an example of a storing address of the transmission target data in the source memory 30, and the packet size is an example of the data size of the transmission target data.

The relay unit 47 performs processing suitable for whether or not the destination of the transferred data is in the same host (server 1), in other words, whether or not the output destination of the transferred data is the virtual port 45 (Step S4).

In cages where the destination is the virtual port 45 (YES in Step S4), in other words, in cases where the destination of the header is the destination memory 30, the relay unit 47 transfers the header attached with the metadata to the virtual port 81 serving as the destination (Step S5).

The virtual port 81 obtains a reception buffer address RA of the destination VNS #1 (Step S6).

Further, on the basis of the transmission buffer address TA included in the metadata and the obtained reception buffer address RA, the virtual port #1 requests the operation instruction issuer 44 for data transfer of the packet from the TA to the RA (Step S7).

The operation instruction issuer 44 instructs the operation processing unit 21 to execute data transfer of the packet: from the TA to the RA (Step S6). In other words, the operation instruction issuer 44 instructs the operation processing unit 21 to transfer the transmission target data from the source memory 30 to the destination memory 30.

In response to the instruction, the operation processing unit 21 performs data transfer from the TA of: the source memory 30 to the RA of the destination memory 30, i.e., data transfer from transmission buffer to the reception buffer in the host memory 3 through the processor 2 (Step S9), and the process ends.

On the other hand, in cases where the destination is outside the same host in Step S4, for example, in cases where the destination is a physical port 46 connected to an external NW or an external I/F (NO in Step S4), the relay unit 47 transfers the header attached with the metadata to the physical port #0 serving as the destination (Step S10).

The physical port #0 obtains, by reading, for example, data (subsequent data) subsequent to the header from the transmission buffer of the source memory 30 on the basis of the TA included in the metadata (Step S11).

The physical port #0 generates (restores) the transmitting packet by combining the header transferred from the relay unit 47 and the subsequent data read from the source memory 30, and outputs the transmitting packet to an external destination, for example, an external NW or an external I/F (Step S12). Then the process ends.

As the above, according to the server 1 of the first embodiment, the data transfer between VMs in the same host can be achieved by the operation processing unit 21. At this time, the data passing through the I/O bus 1b between the processor 2 and the communication device 4 is limited to the header fragment and the metadata of the target, data (packets) to be transferred between the VMs. In other words, the data fragment (payload) of the packet is inhibited from passing through the I/O bus 1b.

For example, the illustrated example assumes that the data size of the header fragment used in a determining process of a destination by the relay unit 47 is 123 B (Bytes) at the maximum and the data size of the entire packet is 1500 B.

In this case, the server 1 of the first embodiment can reduce the amount of using the band of the I/O bus 1b to one tenth or less.

In this way, the use of the band of the I/O bus 1b can be minimized, and the load on the I/O bus can be reduced. Accordingly, occurrence of a bottleneck on the band of the I/O bus 1b can be avoided because turning back of the data on the I/O bus 1b can be avoided in data transfer between VMs in the same host.

Figure 7:
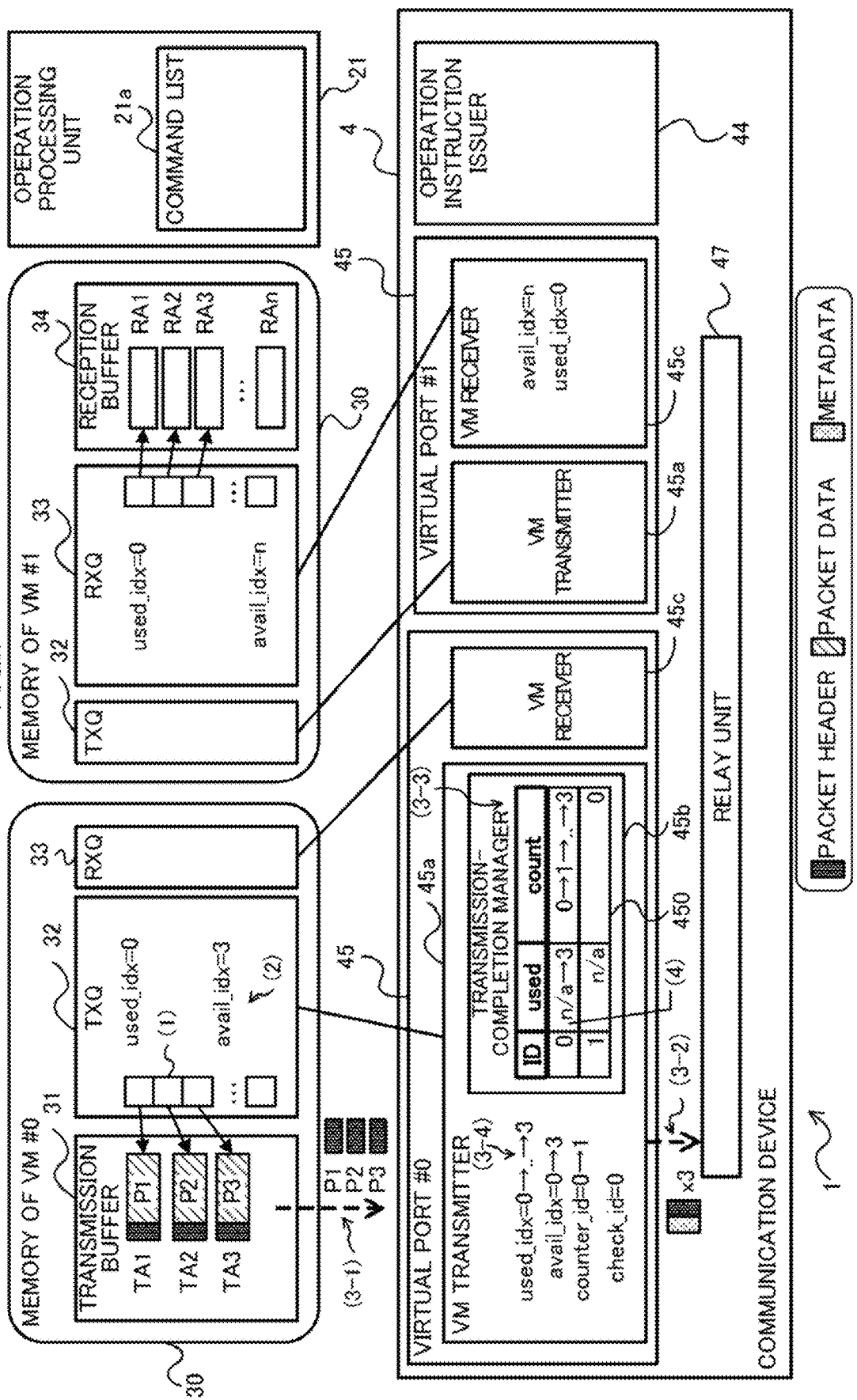
FIG. 7 is a diagram illustrating an example of an action of a data transferring process between VMs.
Figure 8:
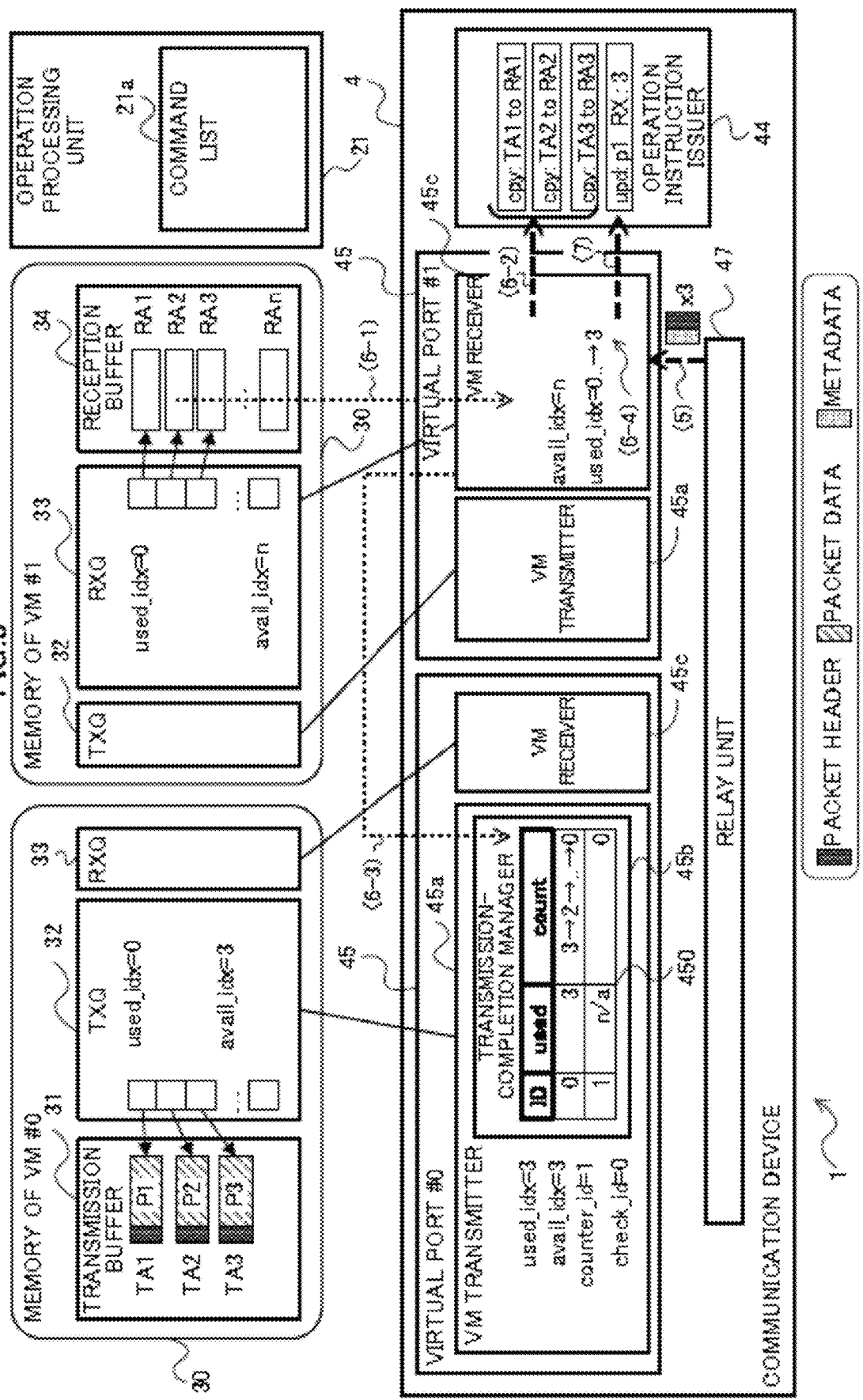
FIG. 8 is a diagram illustrating an example of an action of a data transferring process between VMs.
Figure 9:
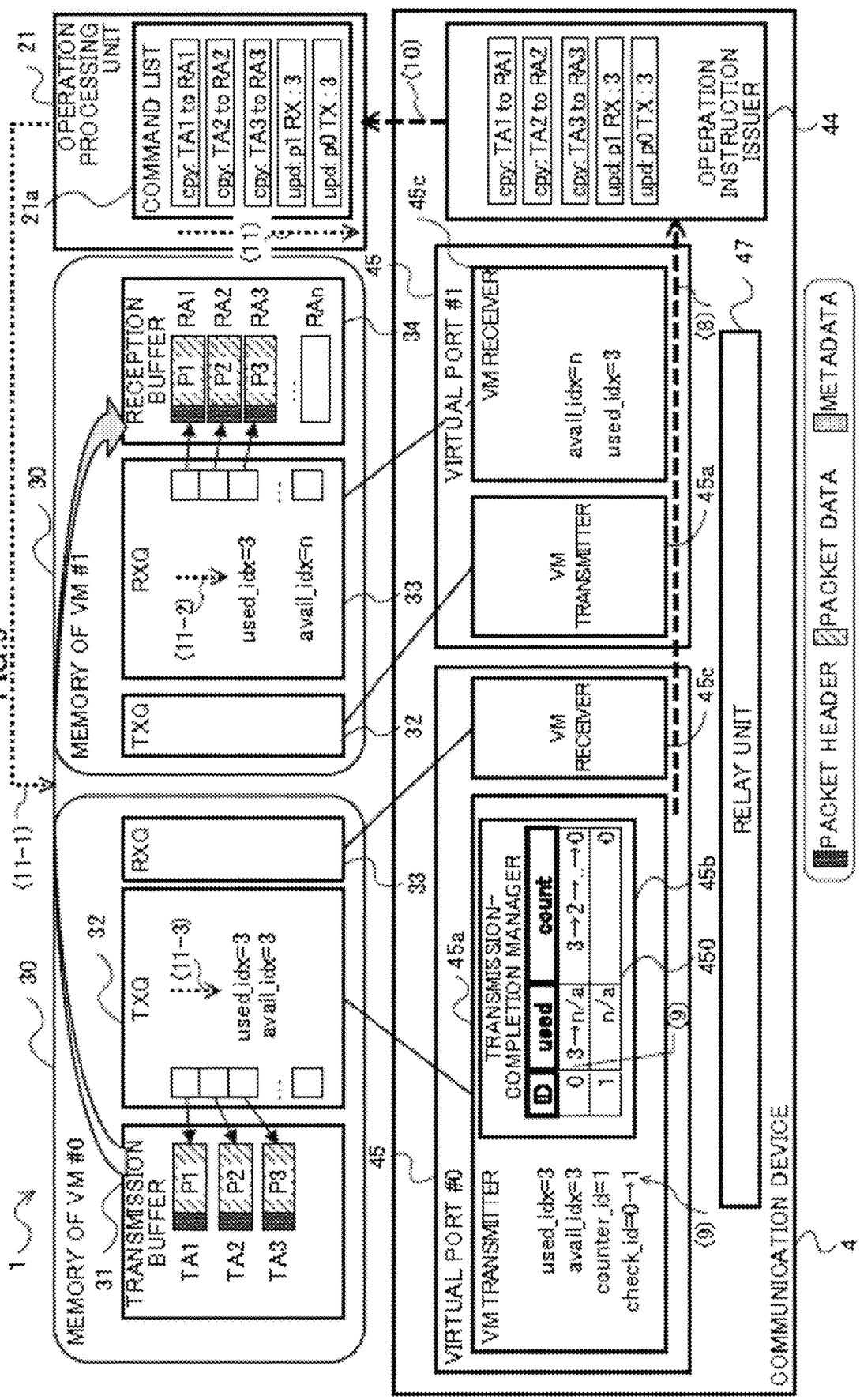
FIG. 9 is a diagram illustrating an example of an action of a data transferring process between VMs.

[1-3] Example of Action of Data Transferring Process Between VMs:

Next, with reference to FIGS. 7 to 9, description will now be made in relation to an example of an action of a data transferring process by the communication device 4 in the server 1 illustrated in FIG. 3. FIGS. 7 to 9 are diagrams illustrating an example of an action of a data transferring process between the VMs.

Like the YES route of Step S4 of the flow chart of FIG. 6, the following description assumes a case where the data in the source memory 30 of the source VM #0 is transferred (transmitted) to the destination memory 30 of the destination VM #1.

(Configuration Example of Server 1)

First of all, description will now be made in relation to an example of the configuration of the server 1 illustrated in FIG. 7. As illustrated in FIG. 7, the operation processing unit 21 may include a command list 21a that holds a command received from the operation instruction issuer 44. The command list 21a may be stored in a storing region that the host memory 3, the operation processing unit 21, or the processor 2 has.

Further, as illustrated in FIG. 7, the source memory 30 may include a transmission buffer 31, a TXQ (transmission queue) 32, and an RXQ (reception queue) 33. The destination memory 30 may include an TXQ 32, an RXQ 33, and a reception buffer 34.

Since each memory 30 can be either a source memory 30 or a destination memory 30, the each memory 30 may include the transmission buffer 31 and the TXQ 32 which are related to a transmitting process, and the each memory 30 may also include the RXQ 33 and the reception buffer 34 which are related to a receiving process.

The TXQ 32 of the memory 30 of a VM may be connected to the VM transmitter 45a of a virtual port 45 associated with the same VM, and the RXQ 33 of the memory 30 of the VM may be connected to the VM receiver 45c of the virtual port 45 associated with the same VM.

As illustrated, in FIG. 7, each of the TXQ 32 and the RXQ 33 has (stores) indexes of avail_idx and used_idx.

The avail_idx is an index that notifies that a packet has been set in the transmission buffer 31 or the reception buffer 34. For example, the avail_idx possessed by the TXQ 32 indicates that data (transmitting data) of a packet has been set in the transmission buffer 31, and the avail_idx possessed by the RXQ 33 indicates that an empty buffer has been set in the reception buffer 34.

The used_idx is a process-completion index that notifies that the buffer indicated by the avail_idx has been used, and serves as an index for data transfer of a packet.

For example, the avail_idx possessed by the TXQ 32 of the source memory 30 is an example of information indicating the storage number of one or more of the transmission target data being stored, and the used_idx possessed by the TXQ 32 is an example of information indicating the transferring number of transmission target data having been transferred to destinations among the one or more transmission target data.

Further, for example, the avail_idx possessed by the RXQ 33 of the destination memory 30 is an example of information indicating the number of storage regions to store one or more of the transmission target data having been received, and the used_idx possessed by the RXQ 33 is an example of information indicating the receiving number of the one or more transmission target data having been received.

For example, the operation processing unit 21, after transferring each of the one or more transmission target data by a process to be described below in an inter-buffer data transferring process, updates, in increment, for example, the used_idx which each of the TXQ 32 and the RXQ 33 possesses.

As described above with reference to FIG. 6, in the server 1 of the first embodiment, the header of a transmitting packet stored in the transmission buffer 31 and the TXQ 32 is first read (obtained), and then the entire transmitting packet is transferred. Therefore, it is difficult to detect the timing of releasing the storing regions of the transmission buffer 31 and the TXQ 32 after the transmitting packet has been stored in the transmission buffer 31 and the TXQ 32.

As a solution to the above, by updating the used_idx by the operation processing unit 21, the first embodiment is made possible to specify a transmitting packet on which the transfer has been completed, i.e., which makes the transmission buffer 31 and the TXQ 32 releasable, on the basis of the used_idx and the avail_idx.

For example, the processor 2 manages the holding region of the transmission buffer 31 to be releasable on the basis of the avail_idx and the used_idx of the corresponding source memory 30 in the execution of the source V& 80. In addition, the processor 2 manages the storage region of the reception buffer 34 to be releasable on the basis of the avail_idx and the used_idx of the corresponding destination memory 30 in the execution of the destination VM #1.

As an example, in cases where the avail_idx matches the used_idx, the processor 2 may manage all the regions in the corresponding transmission buffer 31 and the corresponding TXQ 32 or all the regions in the corresponding reception buffer 34 and the corresponding RXQ 33 to be releasable. In contrast, in cases where the avail_idx does not match the used_idx, the processor 2 may manage regions of the transmission buffer 31 and the TXQ 32 as many as the number of transmitting packets corresponding to the value of the used_idx, or regions of the reception buffers 34 and the RXQ 33 as many as the number of transmitting packets corresponding to the value of the used_idx to be releasable. To manage a holding region or a storage region to be releasable may include, for example, deleting of data stored in the regions or changing of the regions into a writable state.

The VM transmitter 45a of the virtual port 45 possesses avail_idx, used_idx, counter_id, and check_id. The VM receiver 45c of the virtual port 45 possesses avail_idx and used_idx. The avail_idx and the used_idx possessed by each of the VM transmitter 45a and the VM receiver 45c are indexes similar to the avail_idx and the used_idx described above, but the indexes of the avail_idx and the used_idx may be managed independently of one another in the TXQ 32, the RXQ 33, the VM transmitter 45a, and the VM receiver 45c.

The counter_id is a counter associated with transmission of a transmitting packet set, and an ID representing an entry in the management table 450 managed by the transmission-completion manager 45b. A transmitting packet set is one or more transmitting packets that are set in the transmission buffer 31 and transmitted in a transmitting process. In the example of FIG. 7, the transmit packet set may include transmitting packets P1-P3.

A check_id is an ID that identifies the cycle of performing a process, and that, for example, identifies a transmitting packet set. For example, the VM transmitter 45a checks an entry associated with the check_id In the management table 450 of the transmission-completion manager 45b for every cycle, and when the count value is "0", executes a predetermined process and then adds "1" to the check_id. In the example of FIG. 7, the process that deals with a single entry in the management table 450 may include a transmitting process of the transmitting packets P1 to P3.

In each of the memory 30 and the virtual port 45, the initial values of the avail_idx, the used_idx, the counter_id, and the checked may all be "0".

(Example of Action)

Hereinafter, a case is assumed in which the source VM #0 (processor 2) transmits three transmitting packets P1, P2, and P3 to the virtual port #1 of the destination VM #1. The VM #0 may store the transmitting packets P1, P2, and P3 in the transmission buffer 31, and set, in the TXQ 32, the respective transmission buffer addresses TA1, TA2, TA3 of the transmitting packets P3, P2, and P3 stored in the transmission buffer 31 (see the reference number (1)).

Incidentally, the destination VM #1 is assumed to have already set the RXQ 33. For example, the VM #1 may set n (where n is an integer equal to or larger than 2) empty buffers in the reception buffer 34, and set reception buffer addresses RA1, RA2, RA3, . . . RAn of the respective empty buffers in the RXQ 33. In this case, the number "n" corresponding to the number of set RAs is set in the avail_idx of the destination memory 30. The VM receiver 45c of the virtual port #1 associated with the destination VM #1 sets the number "n" the same as the avail_idx of the destination memory 30 in the avail_idx of the VM receiver 45c.

As illustrated in FIG. 7, each of the transmitting packets P1 to P3 may include a packet header (see dark shaded area) and packet data (see hatched area) including at least a data (payload) fragment.

The VM #0 sets "3" representing the number of transmitting packets set in the transmission buffer 31 in the avail_idx of the TXQ 32, and sets "0" in the used_idx of the TXQ 32 because the transmission buffer 31 has not yet been used.

When the avail_idx is updated in the TXQ 32, the VM transmitter 45a of the virtual port #0 detects that the avail_idx has been updated in the TXQ 32 on the basis of the difference between the avail_idx (initial value "0") thereof and the avail_idx ("3") of the TXQ 32 (see the reference number (2)).

The VM transmitter 45a executes the process illustrated in the following reference numbers (3-1) to (3-4) over the number of times corresponding to the difference of the avail_idx ("3" in FIG. 7). The number of repeating (the number of executions) by the VM transmitter 45a is not limited to the difference of the avail_idx. Alternatively, if the maximum number of times per time is set, the smaller one of the maximum number and the difference of avail_idx may be selected as the number of repeating.

The VM transmitter 45a reads the respective packet headers from the TA1, TA2, TA3 of the transmission buffer 31 set in the TXQ 32 on the basis of the used_idx (initial value "0") of the VM transmitter 45a (see the reference number (3-1)).

The VM transmitter 45a attaches respective metadata (see the thin shaded area) associated with the transmitting packets P1 to P3 to the respective packet headers of the transmitting packets P1 to P3, and transfers the transmitting packets P1 to P3 attached with the respective metadata to the relay unit 47 (reference number (3-2)). The metadata may illustratively include the information of the PID of an in-port (virtual input port: virtual port #0 in the example of FIG. 7), the TA (transmission buffer address), the packet size of the transmitting packet in the transmission buffer 31, and the counter_id in the management table 450.

The VM transmitter 45a (transmission-completion manager 45b) increments a count value of an entry indicated by the present counter_id in the management table 450 (see the reference number (3-3). As illustrated in FIG. 7, the management table 450 may include items of "ID" to identify an entry in the transmitting process, "used" to indicate a used value, and "count" to indicate a count value.

The VM transmitter 45a increments the used_idx (see the reference number (3-4)).

As described above, the VM transmitter 45a repeats the process of the reference numbers (3-1) to (3-4) over the number of times the same as the difference between the avail_idx of the VM transmitter 45a and the avail_idx of the source memory 30. After the completion of the repeating, the number "3" is set in the used_idx of the virtual port #0, and the number "3" is set in the count value of the management table 450.

The VM transmitter 45a increases each of the avail_idx and the used value of the management table 450 by the number of times repeating the processes of the reference numbers (3-1) to (3-4) (the number of the difference of the in avail_idx) and increments the counter_id (see the reference number (4)). Consequently, the number "3" is set in the avail_idx of the virtual port #0, the number "3" is set in the used value of the management table 450, and the number "1" is set in the counter_id.

The relay unit 47 performs a transferring process on each of the packet headers attached with the metadata and transferred in the reference number (3-2). A packet header attached with metadata is different from a normal packet in that, the metadata is attached to the packet header in place of the packet data. However, because determining the PID of the transfer destination based on the packet header by the FIB retrieval as described above, the relay unit 47 may perform the same transferring process as one performed on a normal packet for a packet header attached with metadata. In the transferring process, information of the metadata, for example, information such as an in-port, may be used. The transferring process performed by the relay unit 47 may be achieved by various known schemes exemplified by one described in the above Patent Document 1.

As illustrated in FIG. 3, each of the packet headers attached with the metadata is transferred to the VM receiver 45c of the virtual port #1 associated with the destination memory 30 of the VM #1 by the transferring process by the relay unit 47 (see the reference number (5)).

The VM receiver 45c of the virtual port #1 repeats the process illustrated in the following reference number (6-1) to (6-4) on data received from the relay unit 47 within a certain cycle. In the example of FIG. 8, the VM receiver 45c performs processing on each of the packet headers attached with the metadata of the transmitting packets P1 to P3.

The VM receiver 45c obtains a reception buffer address RA stored in the RXQ 33 on the basis of the used_idx (initial value "0") possessed by the VM receiver 45c (see the reference number (6-1)). For example, the VM receiver 45c may obtain the RA1 in the first cycle, the RA2 in the second cycle, and the RA3 in the third cycle in the repeating.

The VM receiver 45c issues a request for inter-buffer data copying from the TA to the RA to the operation instruction issuer 44 on the basis of the obtained RA, the TA and the packet size included in the metadata attached to the received packet header (see the reference number (6-2)).

The VM receiver 45c instructs an in-port (virtual port #0 in FIG. 8) included in the metadata to decrement the count value corresponding to the counter_id of the VM transmitter 45a in the management table 450 of the transmission-completion manager 45b (see the reference number (6-3)).

The VM receiver 45c increments the used_idx possessed by the VM receiver 45c (see the reference number (6-4)).

As described above, the VM receiver 45c repeats the process of the reference numbers (6-1) to (6-4) over the number of times the same as the number of received packet headers attached with the metadata. For example, through the process of the reference number (6-2), commands of "cpy: TA1 to RA1", "cpy: TA2 to RA2", and "cpy: TA3 to RA3" are stored, as commands for instruction for inter-buffer data copying from the TA to the RA, into the operation instruction buffer 44. Furthermore, through the processes of the reference numbers (6-3) and (6-4), the number "0" is set to the count value of the management table 450 of the virtual port #0, and the number "3" is set to the used_idx of the virtual port #1.

In cases where the used_idx has been updated after the lapse of the certain cycle, the VM receiver 45c issues a request for updating the used_idx of the destination memory 30 to the operation instruction issuer 44 (see the reference number (7)). For example, as illustrated in FIG. 8, a command "upd: p1 RX:3" is set in the operation instruction issuer 44. This command is one for instructing the RXQ 33 of the memory 30 (VM #1) connected to the virtual port #1 (p1) to update the used_idx to "3".

Here, through the process of the reference number (6-3) of FIG. 8, the VM transmitter 45a of the virtual port #0 sets the number "0" in the count value of an entry corresponding to check_id in the management table 450.

As illustrated in FIG. 9, in cases where the count value of an entry in the management table 450 associated with the check_id comes to be "0", the VM transmitter 45a of the virtual port #0 issues a request for updating the used_idx of the source memory 30 to the operation instruction issuer 44 (see the reference number (8)). For example, as illustrated in FIG. 9, a command "upd: p0 TX:3" is set in the operation instruction issuer 44. The command is one for instructing the TXQ 32 of the memory 30 (VM #0) connected to the virtual port #0 to update the used_idx to "3" which is the used value of the entry a count value of which comes to be "0" in management table 450.

The VM transmitter 45a of the virtual port #0 invalidates the used value of an entry whose count value in management table 450 has come to be "0" (by setting the value to "n/a", for example), and increments the check_id possessed by the VM transmitter 45a (see the reference number (9)).

The operation instruction issuer 44 notifies the operation processing unit 21 of the command after the lapse of the certain cycle (see the reference number (10)).

The operation processing unit 21 stores the list of commands notified from the operation instruction issuer 44 into the command list 21a, and processes the commands from the top of the command list 21a (see the reference number (11)).

For example, the operation processing unit 21 transfers the transmitting packets P1 to P3 from the TA1 to the TA3 of the transmission buffer 31 to the RA1 to the RA3 of the reception buffer 34 by executing commands ("cpy: . . . ") that instructs the inter-buffer data copying (see the reference number (11-1)). Here, the data to be transferred may be at least the data fragment (payload) of the packet or the entire packet including the header.

The operation processing unit 21 also updates the used_idx of the reception buffer 34 to "3" by executing a command ("upd: p1 RX:3") that instructs to update the process completion index (used_idx) of the reception buffer 34 of the destination memory 30 (see the reference number (11-2)).

In addition, the operation processing unit 21 also updates the used_idx of the transmission buffer 31 to "3" by executing a command ("upd: p0 TX:3") that instructs to update the process completion index (used_idx) of the transmission buffer 31 of the source memory 30 (see the reference number (11-3)).

This completes the data transferring process between the VMs.

The process performed by the operation processing unit 21 and the process for appropriately updating the process-completion index (used_idx) of the virtual, port 45 described above make the relay unit 47 offloaded to, for example, an FPGA possible to execute the packet transfer between VMs while suppressing reading of an entire packet.

For example, in the transmission buffer 31 of the source memory 30, the header fragment of a packet to be stored into transmission buffer 31 is read by the virtual port 45, and then at least the data fragment of the packet to be stored is transferred by inter-buffer copying by the operation processing unit 21.

As the above, since the communication device 4 does not read the entire packet, the communication device 4 has difficulty in determining, by referring to the transmission buffer 31 and the TXQ 32, whether or not the processing on a packet in the transmission buffer 31 has been completed.

In contrast, the transmission-completion manager 45b described above manages by which entry in each of the transmission buffer 31 and the TXQ 32 has been processed using the used value and the count value, and notifies the operation instruction issuer 44 at the timing when the process-completion indexes comes to be updatable. This can appropriately update the process-completion index (used_idx) of the virtual port 45.

Figure 10:
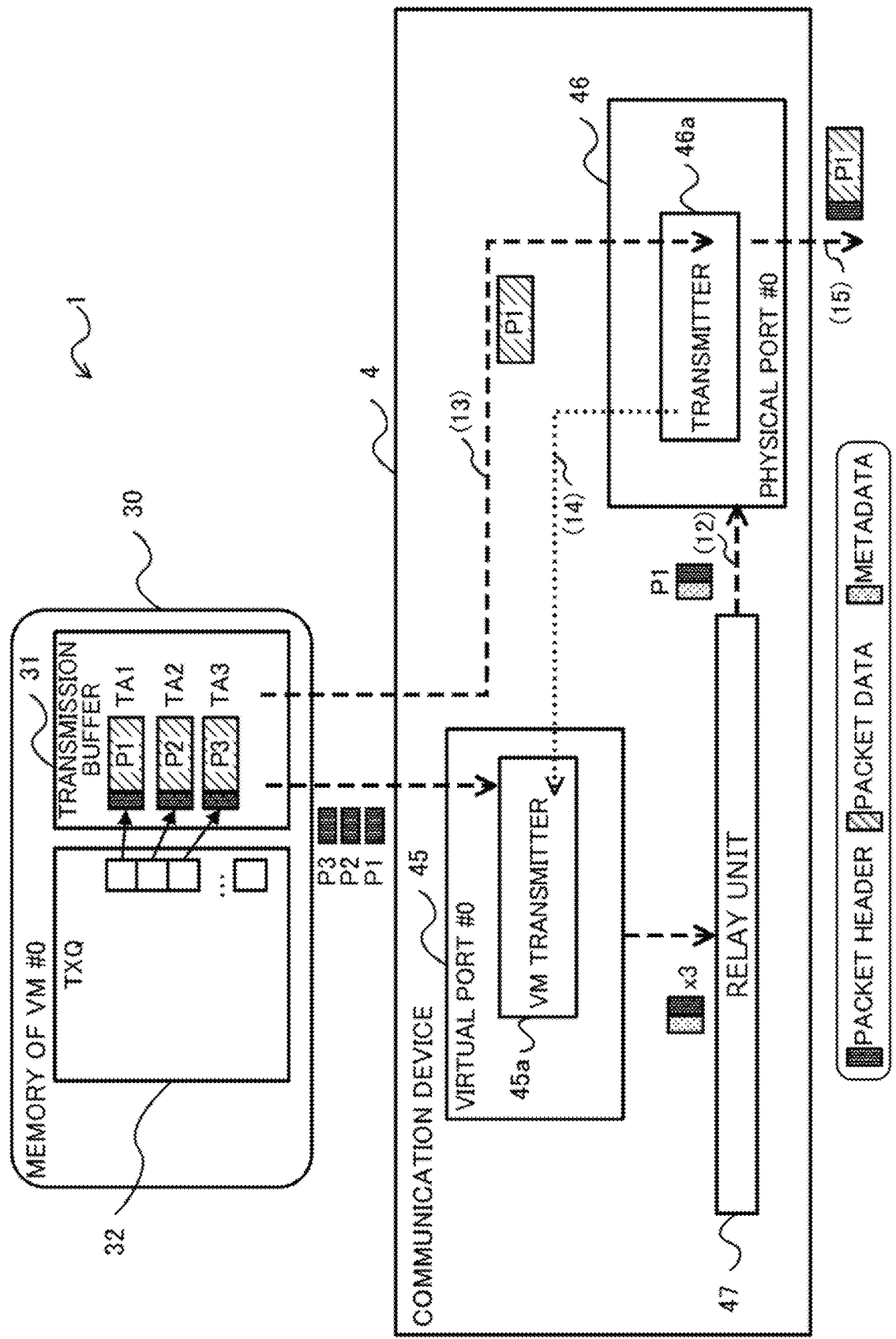
FIG. 10 is a diagram illustrating an example of an action of a data transferring process from the VM to an external entity.

[1-4] Example of Action of Transferring Process from VM to External Entity:

Next, with reference to FIG. 10, description will now be made in relation to an example of an action of a data transferring process by the communication device 4 in the server 1 illustrated in FIG. 3. FIG. 10 is a diagram is a diagram illustrating an example of an action of a data transferring process from the VM to an external entity.

Like the NO route of Step S4 of the flow-chart of FIG. 6, the following description assumes a case where the data in the source memory 30 of the source VM #0 is transferred (transmitted) to an external entity of the server 1 through the physical port #0. For example, a case where the source VM #0 (processor 2) transmits three transmitting packets P1, P2, and P3 to an external entity through the physical port #0.

As illustrated in FIG. 10, a physical port 46 may exemplarily include a transmitter 46a. The transmitter 46a performs processing relating to a packet to be transmitted to the virtual port 45, an external NW, or an external I/F, in other words, a packet to be transmitted (relayed) by the communication device 4.

Incidentally, the process up to the reference number (4) illustrated in FIG. 7 is the same as the data transferring process between VMs, and the description thereof is omitted here.

As illustrated in FIG. 10, when the destination of the header of a transmitting packet (for example, P1) is the physical port 46, the relay unit 47 outputs the header attached with the metadata to the physical port #0 which is the destination (see the reference number (12)).

The transmitter 46a of the physical port #0 reads subsequent data of the transmitting packet (for example, P1), for example, the packet data (payload), on the basis of the transmission buffer address TA and packet size included in the metadata attached to the header (see the reference number (13)).

The transmitter 46a instructs the VM transmitter 45a of the in-port (virtual port #0 in FIG. 10) included in the metadata attached to the header to decrement the count value corresponding to the counter_id in the management table 450 of the transmission-completion manager 45b (see the reference number (14)).

The transmitter 46a combines the header received from the relay unit 47 with the subsequent data (packet data) obtained by the process of the reference number (13) to generate (restore) a transmitting packet (e.g., P1), and outputs the transmitting packet to an external entity (see the reference number (15)). Then the process ends.

The physical port 46 can transmit, for example, the transmitting packets P1, P2, and P3 to the external entity of the server 1 by executing the above-described process of the reference numbers (13) to (15) each time receiving a header attached with metadata from the relay unit 47 in the process of the reference number (12).

[1-5] Example of Action of Data Transferring Process from External Entity to VM:

A packet transmitted from an external entity of the server 1 to the server 1 is received in the communication device 4 (e.g., the physical port #0) in its entirety. In this case, the physical port #0 then writes the entire packet into the reception buffer 34 in the destination memory 30 of the destination VM #1. Writing a packet into the reception buffer 34 may be accomplished in any typical manner.

The procedure of updating the used_idx possessed by the VM receiver 45c of the virtual port #1 serving as the destination from the physical port. #0 and the procedure of updating the used_idx of the destination memory 30 may be performed in the same manner as the processes of the reference numbers (6-4) and (7) illustrated in FIG. 9, and the reference numbers (10), (11), and (11-2) illustrated in FIG. 9.

As described above, since the server 1 of the first embodiment can appropriately update the process-completion index (used_idx) of the virtual port 45 in the data transferring process between the VM and an external entity, packet transfer can be performed normally.

Here, the virtual switch according to the first embodiment and the second embodiment to be described below may deal with an action (hereinafter, sometimes referred to as "header changing action") that changes the header contents of a packet. An example of the header changing action is at least one of addition a new field, removal of an existing field, and modification of the content to (from) a header of a packet that matches a setting rule. The header changing action may be performed, for example, by the operation applying unit 47b.

For example, in cases where a header changing action is performed on the virtual switch, the packet transfer between the virtual ports 45 according to the first and second embodiments may include the following steps (i) to (iv).

(i) The VM transmitter 45a of the virtual port 45 stores the header length received from the source VM (or the header length obtained by analysis in the communication device 4) in metadata to be attached to a received header data.

(ii) In cases of changing the header length by applying the header changing action, the operation applying unit 47b additionally stores the header length after the updating into the metadata.

(iii) The VM receiver 45c of the virtual port 45 writes the header data after the change into the obtained reception buffer address.

(iv) The VM receiver 45c issues a request for inter-buffer data copying to the operation instruction issuer 44, which request has the contents of:

"cpy: (transmission buffer address+header length before the change) to (reception buffer address+header length after the change), packet length−header length before the change"

This allows the virtual switch to properly transfer a packet to which the header changing action has been applied because the request for inter-buffer data copying replaces an instruction to copy only the payload fragment obtained by excluding the header from a packet to be transferred.

[2] Second Embodiment

Figure 11:
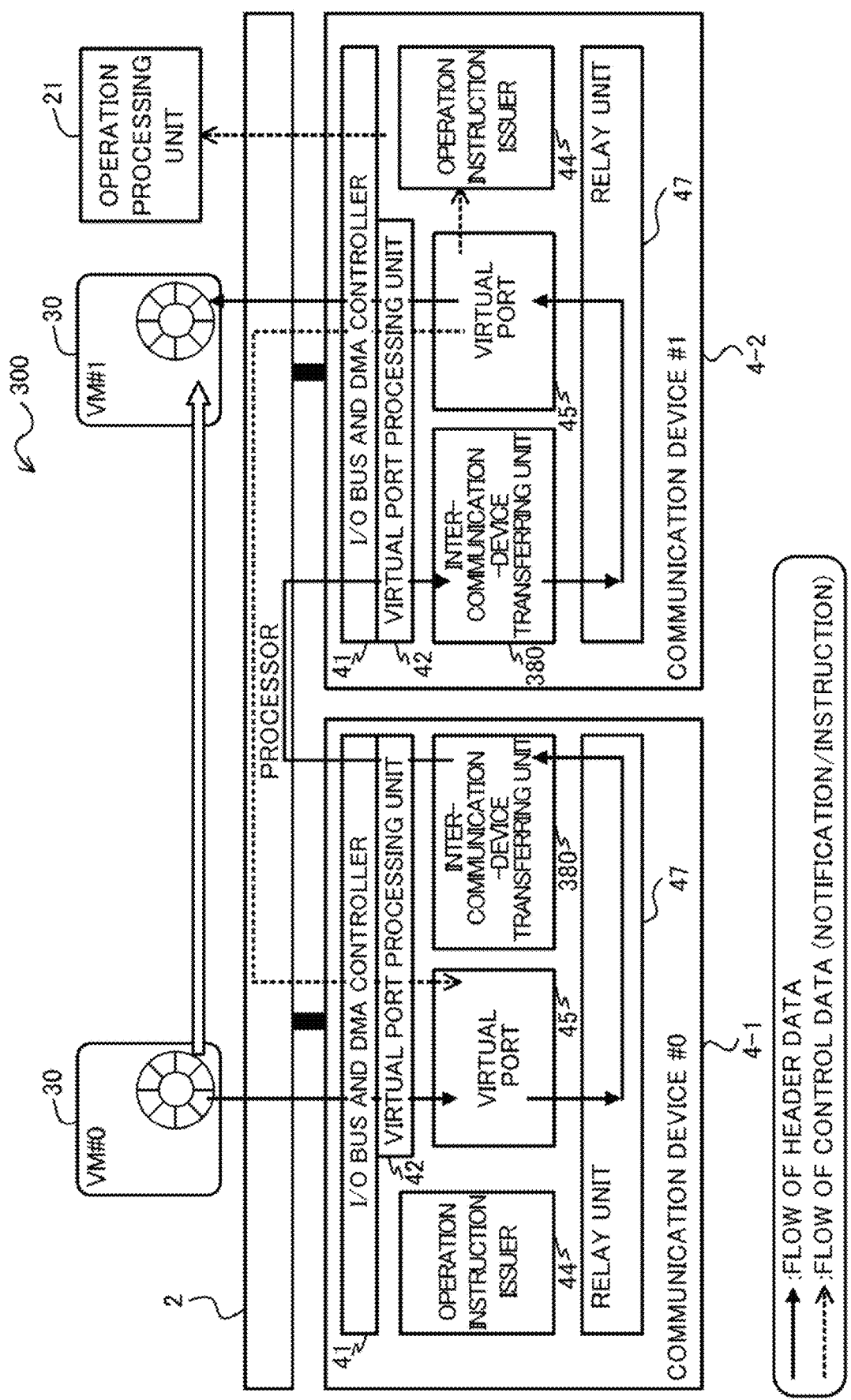
FIG. 11 is a diagram illustrating an example of an action of a server according to a comparative example of a second embodiment.
Figure 12:
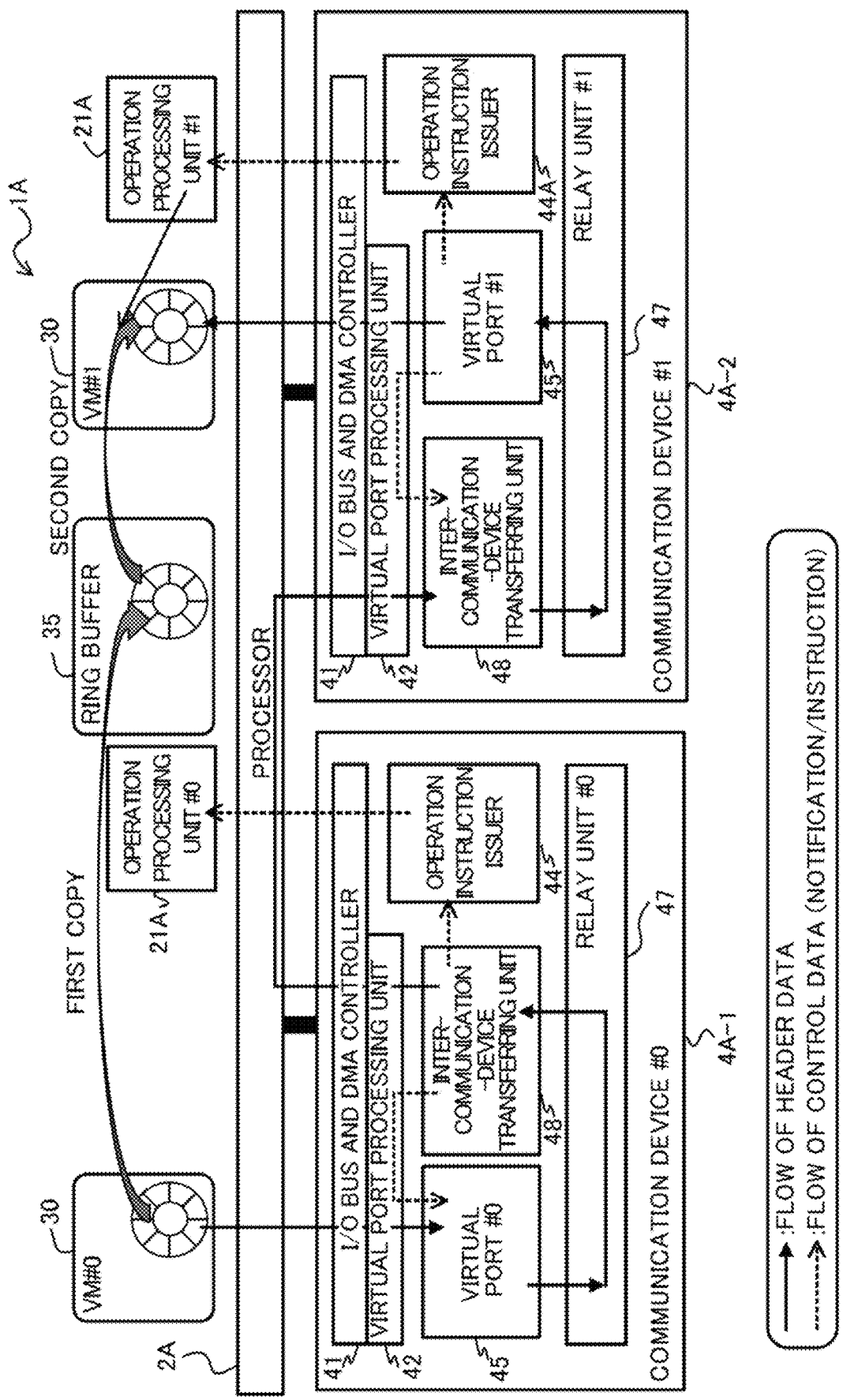
FIG. 12 is a diagram illustrating an example of an action of a server according to the second embodiment.

FIG. 11 is a diagram illustrating an example of an action of a server 300 according to a comparative example of a second embodiment, and FIG. 12 is a diagram illustrating an example of an action of a server 1A according to the second embodiment.

As illustrated in FIG. 11, the description of a comparative example of the second embodiment assumes that a packet is transferred in a server 300 connected to multiple communication devices 4, for the purpose of scaling up, as compared with the server 1 of the first embodiment. In each of communication devices 4-1 and 4-2, an inter-communication-device transferring unit 380 is a functional unit that transfers data between the communication devices 4-1 and 4-2.

As illustrated in FIG. 11, in cases where the communication device 4-1 (communication device 30) connected to the source VX #0 of a packet is different from the communication device 4-2 (communication device #1) connected to the destination VM #1, the header data follows a path indicated by the solid arrows in the server 300. For example, the header data is transferred from the communication device 4-1 through the I/O bus and DMA controller 41 to the processor 2, and further transferred from the processor 2 through the I/O bus and DMA controller 41 to the communication device 4-2.

As the above, in cases where the source VM #0 and the destination VM #1 are connected to different communication devices 4, turning back (loop-back) of the header data occurs on the I/O bus. This may increase the moving distance, i.e., the delay, of the header data to an output port (for example, the virtual port 45 of that communication device 4-2) that can issue a copying instruction of a releasing condition.

Also, as illustrated by the broken arrows in FIG. 11, the delay may be further increased because copying instruction completion notification from the output port to the input port (e.g., the virtual port 45 of the communication device 4-1) will pass through the I/O buses.

As described above, in the server 300, due to the factors described above, for example, releasing of the transmission buffer 31 of the communication device 4-1 may be delayed, so that the performance of the source VM #0 may be degraded.

As a solution to the above, as illustrated in FIG. 12, the description of the second embodiment will now be made in relation to a method of Inhibiting the delay in releasing the transmission buffer 31 of the source VM and also suppressing the performance degradation of the source VM while improving the bottleneck of the band of the I/O bus 1b by the server 1A.

As illustrated in FIG. 12, the server 1A of the second embodiment includes multiple communication devices 4A to be offloaded, and controls the multiple communication devices 4A as a single virtual switch by causing these communication devices 4A to cooperate with each other. The multiple communication devices 4A can be regarded as multiple divisions and spreads of the configuration and the function of the communication device 4 for achieving the relaying function of the virtual switch of the first embodiment. In ether words, a communication device 4 can be said to have multiple communication devices 4A.

The server 1A of the second embodiment may operate such that, for example, a series of processes from data input to copying instruction completion notification can be completed within each individual communication device 4A even when the source VM and the destination VM are connected to different communication devices 4A.

As illustrated in FIG. 12, the server 1A may complete a process performed until the transmission buffer 31 is released for each transfer device 4A by executing, through a ring buffer 35 that the host memory 3A includes, an inter-VM transferring process in the same server 1A which process accompanies transfer between the communication devices 4A. The ring buffer 35 is an example of a third storing region used for transfer of data.

For this purpose, each communication device 4A of the server 1A may include an inter-communication-device transferring unit 48 that transfers data between the communication devices 4A. The processor 2A of the server 1A may include the operation processing units 21A one for each of the communication devices 4A. The multiple operation processing unit. 21A can be regarded as multiple divisions and spreads of the configuration and the function of the operation processing unit 21 of the first embodiment. In other words, the operation processing unit 21 can also be said to include the multiple operation processing units 21A.

For example, the operation processing unit 21A (operation processing unit #0) on the side of the source VM #0 (input side) may operate the host memory 3A of the communication device 4A-1 (communication device #0) on the input side. In addition, the operation processing unit 21A (operation processing unit #1) on the side of the destination VM #1 (output side) may operate the host memory 3A of the communication device 4A-2 (communication device #1) on the output side. Examples of the operations on the host memory 3A include inter-buffer data copying in the host memory 3A through the processor 2A, updating of the process completion indexes of the transmission and reception queues, as described above.

The communication device 4A-1 is an example of a first relay device associated with a source memory 30 which is an example of a first storing region, and the communication device 4A-2 is an example of a second relay device associated with a destination memory 30 which is an example of a second storing region. Further, the operation processing unit #0 is an example of a first transfer processor associated with the communication device #0, and the operation processing unit #1 is an example of a second transfer processor associated with the communication device #1.

For example, the server 1A may execute first copying and second copying, using a ring buffer 35.

The first copy is an example of the first transferring process and specifically is data copying from the communication device 4A-1 (the communication device #0) on the side of the source VM #0 (input side) to the ring buffer 35 by the operation processing unit ft-Q. For example, the communication device #0 may instruct the operation processing unit #0 to perform the first transfer on the transmission target data from the source memory 30 to the ring buffer 35. In response to the instruction for the first, transfer, the operation processing unit #0 may perform a first copying that transfers the transmission target data from the source memory 30 to the ring buffer 35 through the processor 2A.

The first copying can be, in one aspect, regarded as copying the destination of which is changed to the ring buffer 35 in the inter-buffer data copying of the first embodiment.

The second copying is data copying from the ring buffer 35 to the communication device 4A-2 (communication device #1) on the side of the destination #1 side (output side) by the operation processing unit #1. For example, the communication device #1 may instruct the operation processing unit #1 to execute second transfer on transmission target data from the ring buffer 35 to the destination memory 30. In response to the instruction for the second transfer, the operation processing unit #1 may perform second copying that transfers the transmission target data from the ring buffer 35 to the destination memory 30 through the processor 2A.

The second copying can be, in one aspect, regarded as copying the source of which is changed to the ring buffer 35 in the inter-buffer data copying of the first embodiment.

Incidentally, the operation processing unit #1 on the output side may wait for completion of the first copying and execute the second copying after the first copying is completed. This can avoid a circumstance where the second copying is executed before the completion of the first copying and thereby empty data is transferred, and correct data copying from the source VM #0 to the destination VM #1 can be guaranteed.

Figure 13:
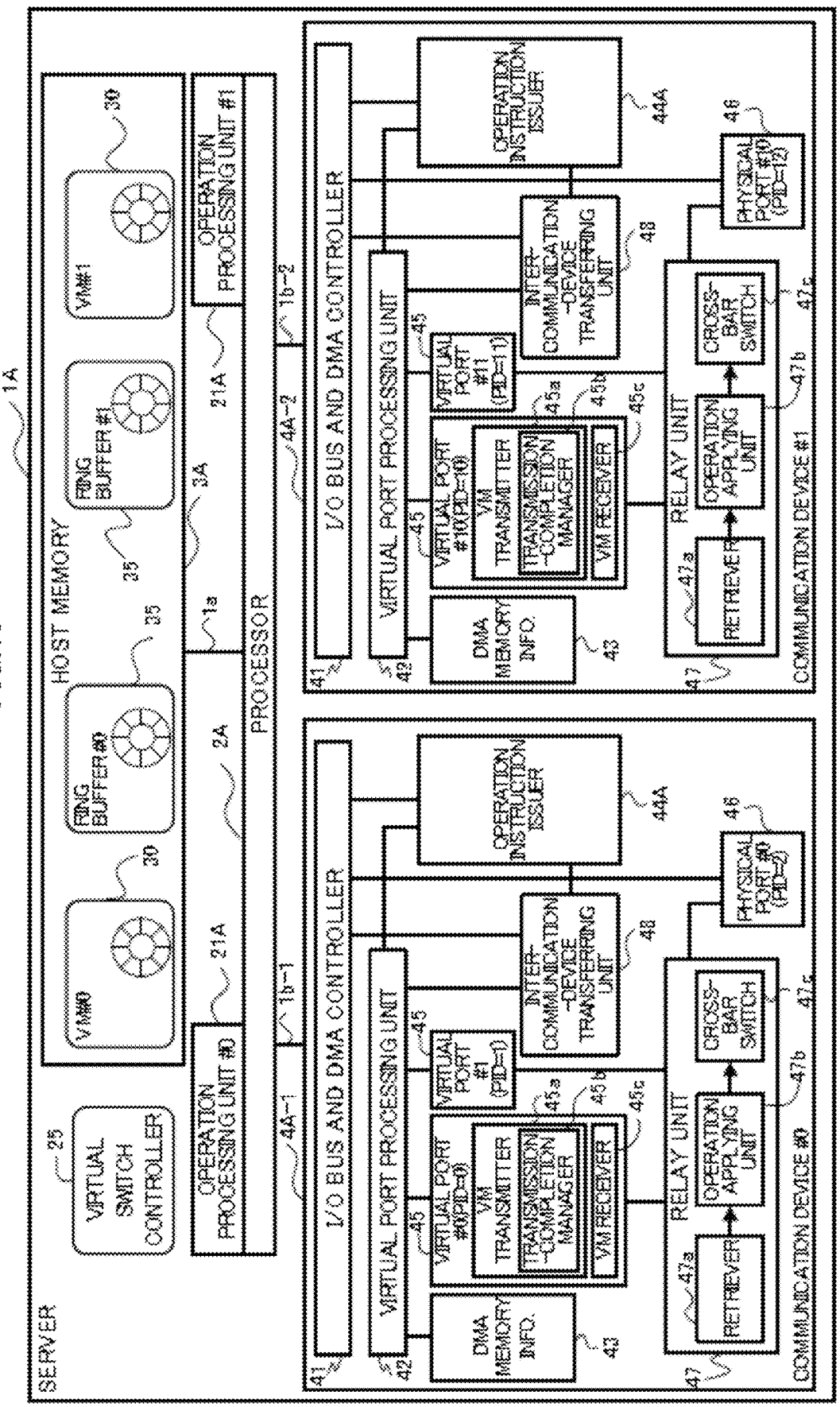
FIG. 13 is a block diagram schematically illustrating an example of the configuration of the server of the second embodiment.

[2-1] Example of Configuration of Server;

FIG. 13 is a block diagram schematically illustrating an example of the configuration of a server 1A according to the second embodiment. The server 1A according to the second embodiment is an example of an information processing apparatus or a computer, and as illustrated in FIG. 13, may exemplarily include a processor 2A, a host memory 3A, and multiple (two in the example of FIG. 13) communication devices 4A.

The processor 2A is an integrated circuit (IC) that performs various controls and arithmetic operations in the server 1A, and is an example of a processing device, or an arithmetic operation processing device. In the second embodiment, the processor 2A is assumed to be connected to the host memory 3A and to execute multiple virtual machines (VMs) #0 and #1 using at least a part of the storing region of the host memory 3A. The processor 2A may be the same as the processor 2 of the first embodiment except for the point of including multiple (two in the example of FIG. 13) operation processing units 21A and a virtual switch controller 25.

Each operation processing unit 21A operates the host memory 3A in response to an instruction from the communication device 4A. In the second embodiment, each operation processing unit 21A is a module independent of the communication device 4A to which the relaying function is offloaded from the processor 2A, and is a module that can be controlled from the same communication device 4A. Examples of the operations on the host memory 3A include updating of an index of the ring buffer 35, and waiting for processing in addition to inter-buffer data copying in the host memory 3A through the processor 2A, updating of the process-completion indexes of the transmission and reception queues.

The virtual switch controller 25 is software that sets a virtual packet relay device in response to setting and operations made by the user, and may be executed, for example, by the processor 2A. For example, when offloading the relaying function to the communication device 4A, the virtual switch controller 25 may properly set the communication device 4A and be responsible for a process on a flow that the communication device 4A has not been trained and data that the communication device 4A is unable to process. The above-described functions of the virtual switch controller 25 may be provided in the processor 2 of the server 1 of the first embodiment.

Further, the virtual switch controller 25 of the second embodiment may execute PID setting and flow registration in order to cooperate the multiple communication devices 4A to present as a single virtual switch to the user. Additionally, the virtual switch controller 25 may implement preparation of the ring buffer 35 and setting of the communication device 4A.

The host memory 3A may include a storing region for storing a program and data executed by the processor 2A. The host memory 3A is the same as the host memory 3 of the first embodiment except for the point that the host memory 3A is provided with one or more (two in the example of FIG. 13) ring buffers 35. For example, the host memory 3A may include the ring buffers 35 for each direction of data-copying between VMs across the communication devices 4A.

In the example of FIG. 13, the host memory 3A may include a ring buffer #0 used for data copying from the memory 30 of the VM #0 to the memory 30 of the VM #1, and a ring buffer #1 used for data copying from the memory 30 of the VM #1 to the memory 30 of the VM #0.

Each ring buffer 35 is a buffer or an example of a third storing region, and may be associated with, for example, an output unit of the inter-communication-device transferring unit 48 of the communication device 4A. The association (assignment) may be performed, for example, by the virtual switch controller 25 or the inter-communication-device transferring unit 48. Each ring buffer 35 may be referred to as an intermediate buffer or a relay buffer.

Each ring buffer 35 may store data, the avail_idx representing availability, used_idx representing process completion, and additionally, done_idx representing completion of the first copying.

Each communication device 4A, like communication device 4 of the first embodiment, is a device that executes communication, and is an example of a relay device.

The processor 2A and the host memory 3A may be communicably connected to each other via a memory bus 1a. The processor 2A and the communication device 4A-1, and the processor 2A and the communication device 4A-2 may be communicably connected to each other via the I/O buses 1b-1 and 1b-2, respectively. The I/O buses 1b-1 and 1b-2 are each an example of an input and output bus.

Figure 14:
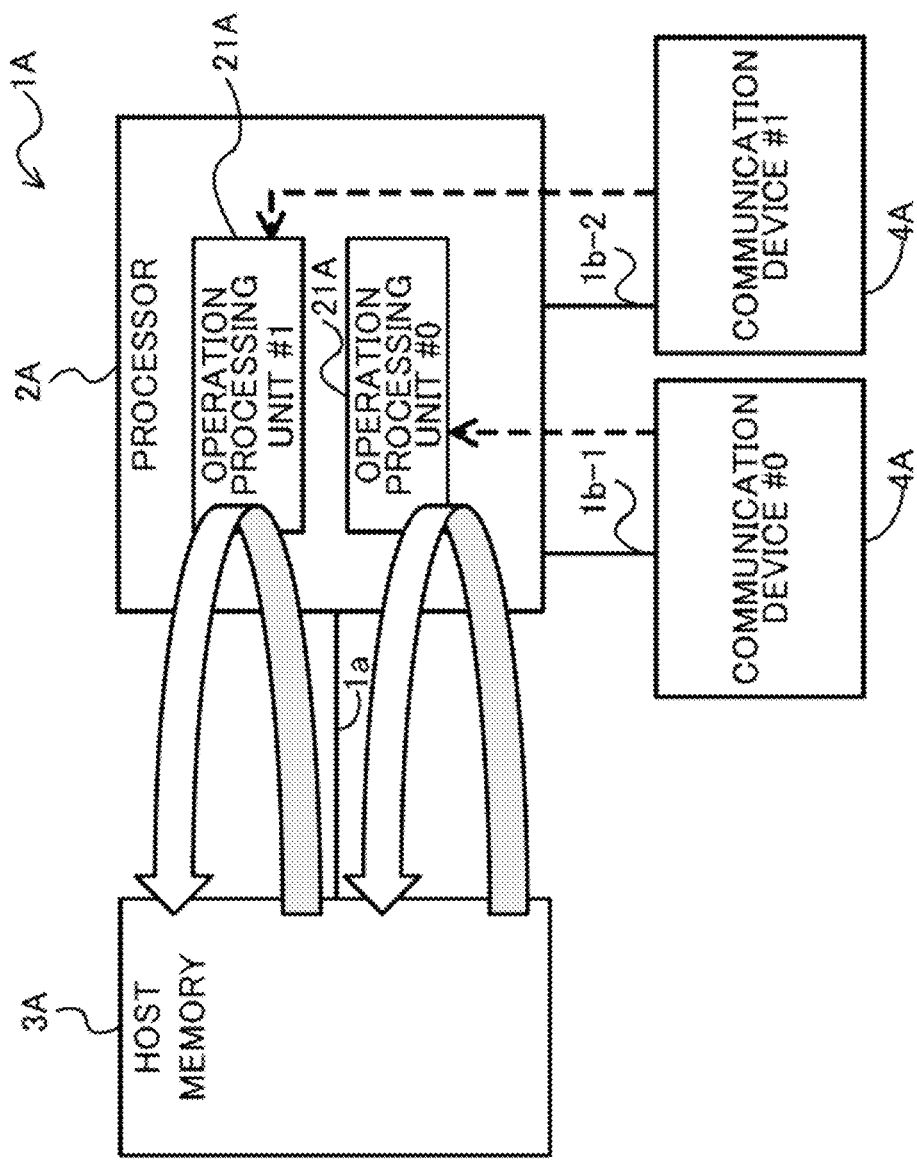
FIG. 14 is a diagram illustrating an example of connecting an operation processing unit, a host memory, and a communication device according to the second embodiment.
Figure 15:
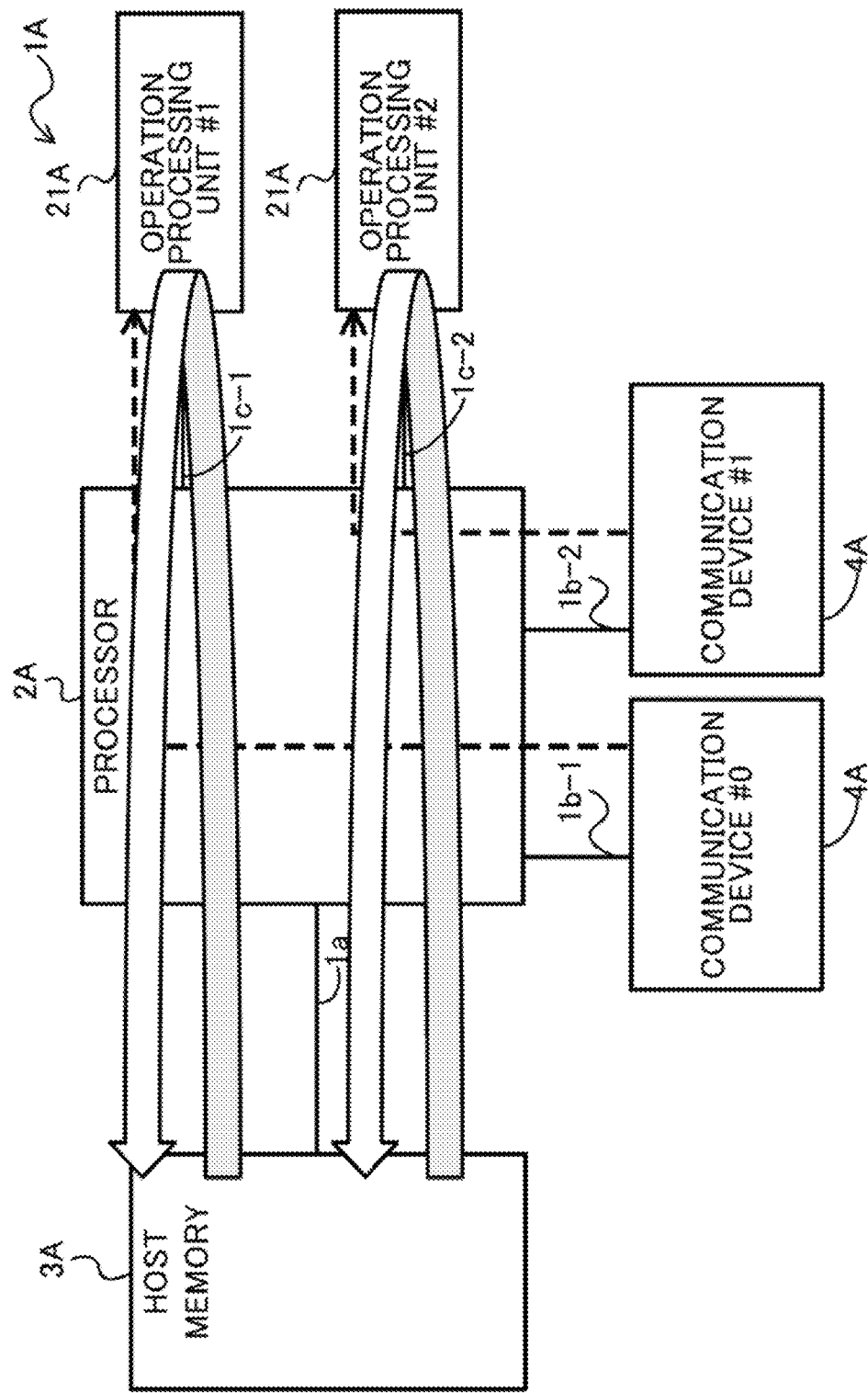
FIG. 15 is a diagram illustrating an example of connecting the operation processing unit, the host memory, and the communication device according to the second embodiment.
Figure 16:
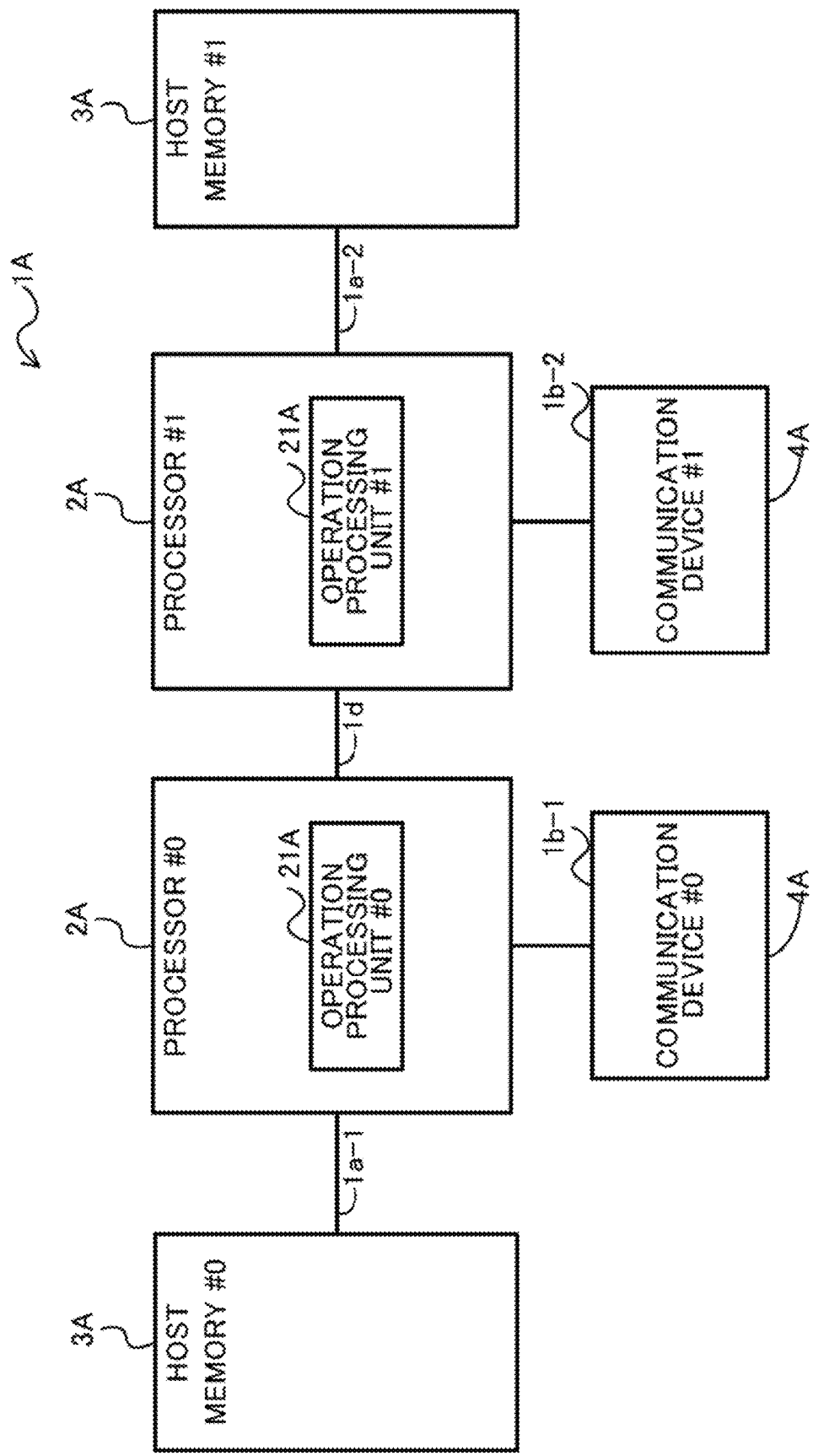
FIG. 16 is a diagram illustrating an exemplary connection of the operation processing unit, the host memory, and communication device according to the second embodiment.

FIGS. 14 to 16 are diagrams illustrating examples of connecting the operation processing units 21A, the host memory 3A, and the communication devices 4A.

In the first example illustrated in FIG. 14, multiple operation processing units 21A may be implemented in the server 1A as one of the functions of: the processor 2A. In other words, the processor 2A may include the multiple operation processing units 21A. In this case, the operation processing units 21A may be implemented as software executed by the processor 2A or as a hardware function in the processor 2A. In the example of FIG. 14, the operation processing units #0 and #1 may communicate with the host memory 3A via a memory controller (not illustrated) provided in the processor 2A (or the server 1A) and the memory bus 1a. In addition, the operation processing units #0 and #1 may communicate with the communication devices #0 and #1, respectively, via an I/O bus controller (not illustrated) provided in the processor 2A (or server 1A) and respective I/O buses 1b.

In the second example illustrated in FIG. 15, the operation processing units 21A may be implemented, as I/O devices independent of communication devices 4A, in the server 1A. For example, communication devices H0 and #1 may be connected to the processor 2A respectively via the I/O bus 1b-1 and 1b-2, which are examples of a first input and output bus. Besides, operation processing units #0 and #1 may be connected to the processor 2A respectively via the I/O buses 1c-1 and 1c-2, which are examples of a second input and output bus different from the first input and output bus.

In the example of FIG. 15, the operation processing units #0 and #1 may communicate with processor 2A (and the host memory 3A and the respective communication devices 4A) via an I/O bus controller (not illustrated) provided by processor 2A (or the server 1A) and the respective I/O buses 1c-1 and 1c-2. Since the operation processing units #0 and #1 do not share the I/O bus 1b-1 and 1b-2 with the communication devices 4A, degradation in communication performance in the I/O buses 1b on the side of the communication device 4A can be reduced.

The third example illustrated in FIG. 16 is a case where the server 1A is a multi-processor system. The server 1A may be, for example, a multi-processor system of a shared memory type exemplified by a Non-Uniform Memory Access (NUMA) architecture. In the third example of FIG. 16, the processors #0 and #1 and communication devices #0 and #1 are accessible, by the function of processor 2A, to both the host memories #0 and #1. For example, the processors #0 and #1 are seamlessly accessible to both the host memories #0 and #1. In the third example in FIG. 16, each of the VMs #0 and #1 and the ring buffers #0 and #1 may be provided in either host memory 3A between the host; memories #0 and #1.

Returning to the description of FIG. 13, the communication device 4A may include an operation instruction issuer 44A different from the operation instruction issuer 44 of the communication device 4 of the first embodiment. Each communication device 4A may also include an inter-communication-device transferring unit 48.

The operation instruction issuer 44A issues a command to the operation processing unit 21A on the basis of an instruction from the virtual port processing unit 42 or the inter-communication-advice transferring unit 48.

In cases where the output port of a packet is that of another communication device 4A, the inter-communication-device transferring unit 48 transfers data to the communication device 4A having the output port. The inter-communication-device transferring unit 48 also receives data transferred from another communication device 4A.

For example, in transferring data, the inter-communication-device transferring unit 48 may obtain a next usable buffer address and a next usable index from the ring buffer 35 associated with the inter-communication-device transferring unit 48. The inter-communication-device transferring unit 48 may then update the metadata to be attached to data to be transferred, using the obtained information, and issue a copying instruction to the operation instruction issuer 44A. In addition, the inter-communication-device transferring unit 48 may also notify an input port of the copying instruction completion.

Figure 17:
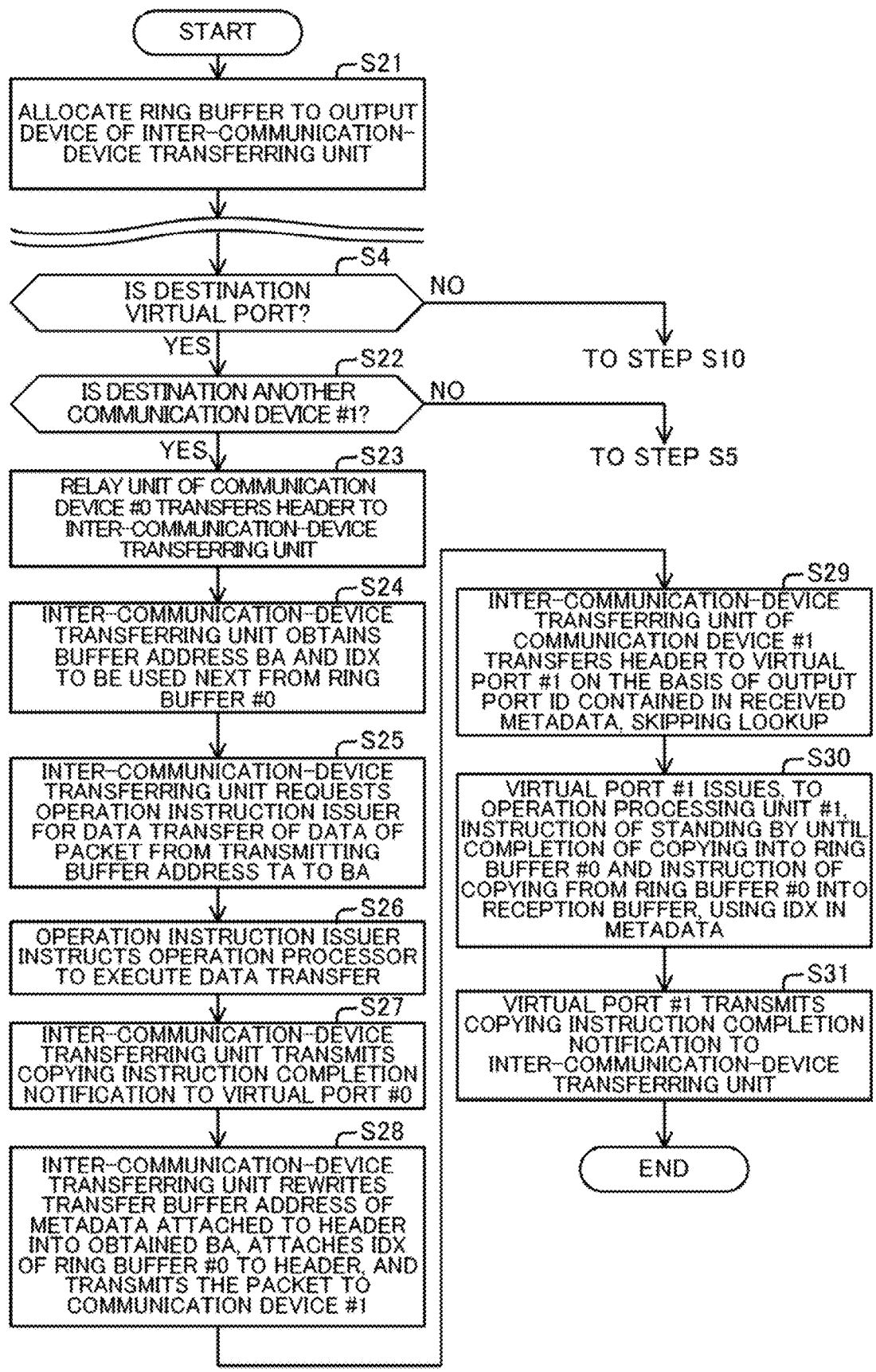
FIG. 17 is a flowchart illustrating an example of an action of a data transferring process in the server of the second embodiment.

[2-2] Example of Action of Data Transferring Process:

Next, with reference to FIG. 17, an example of an action of a data transferring process in the server 1A illustrated in FIG. 13 will now be described. FIG. 17 is a flowchart illustrating an example of an action of a data transferring process in the server 1A.

The following description assumes a case where, in the above server 1A illustrated in FIG. 13, data in the memory 30 of the VM #0 is transferred (transmitted) to the memory 30 of the VM #1 under a state where the VM #0 and the VM #1 are connected to respective different communication devices 4A. Incidentally, FIG. 13 may be an example of an action in which the process according to the second embodiment is added to an example of the action of the first embodiment illustrated in FIG. 6.

In virtual switch controller 25 or the inter-communication-device transferring unit 48 allocates the ring buffer #0 to the output unit of inter-communication-device transferring unit 48 (Step S21), and a process of Steps S1 to S4 is executed in the same manner as in FIG. 6.

In Step S4, in cases where the destination is the virtual port 45 (YES in Step S4), the relay unit 47 of the communication device #0 determines whether the destination is another communication device 4A (e.g., the communication device #1) (Step S22). In cases where the destination is not another communication device 4A (No in Step S22), the process moves to Step S5.

In cases where the destination is another communication device 4A (i.e., the communication device #1) (YES in Step S22), the relay unit 47 of the communication device #0 transfers the header to the inter-communication-device transferring unit 48 (Step S23).

The inter-communication-device transferring unit 48 obtains the buffer address RA and the index IDX that are to be used next from the ring buffer #0 (Step S24).

On the basis of transmission buffer address TA included in the metadata of Step S3 and the obtained reception buffer address RA, the inter-communication-device transferring unit 48 requests the operation instruction issuer 44A for data transfer of the packet from the TA to the RA (Step S25).

The operation instruction issuer 44A instructs the operation processing unit #0 to execute data transfer of the packet from the TA to the RA (Step S26). In ether words, the operation instruction issuer 44A instructs the operation processing unit #0 to transfer the transmission target data from the source memory 30 to the ring buffer 35.

The operation processing unit #0 executes data transfer from the source memory 30 to the RA of the ring buffer 35 in response to the instruction.

The inter-communication-device transferring unit 48 also transmits copying instruction completion notification to the virtual port #0 of the source (Step S27). Therefore, in the source VM #0, it is possible to manage the transmission buffer 31 to be releasable so that the delay in releasing the transmission buffer 31 can be inhibited.

The inter-communication-device transferring unit 48 rewrites the transmission buffer address of the metadata attached to the header to the RA obtained from the ring buffer #0, attaches the index IDX of the ring buffer #0 to the header, and transfers the header to the communication device #1 (Step S28).

The inter-communication-device transferring unit 48 of the communication device #1 skips lookup on the basis of the output port ID (PXD) contained in the metadata of the received header, and transfers the header to the virtual port #1 (Step S29).

The virtual port #1 issues an instruction of standing by until completion of (first) copying into the ring buffer #0 and a copying instruction of copying from the ring buffer #0 to the reception buffer 34 of the communication device #1 to the operation processing unit #1, using the IDX in the metadata (Step S30).

After standing by until the completion of the first copying, the operation processing unit #1 executes data transfer from the TA of the ring buffer 35 to the RA of the destination memory 30 in response to the copying instruction.

The virtual port #1 transmits copying instruction completion notification to the inter-communication-device transferring unit 48 (Step S31) and terminates the process.

As described above, according to the server 1A of the second embodiment, in the data transfer between VMs in the same host, even when the communication device 4A connected to the source VM and one connected to the destination VM are different from each other, a series of processing from data input to the copying instruction completion notification can be completed in each communication device 4A. This can inhibit the delay in releasing the transmission buffer 31 of the source VM and also suppress the performance degradation of the source VM while improving the bottleneck of the band of the I/O bus 1b.

Figure 18:
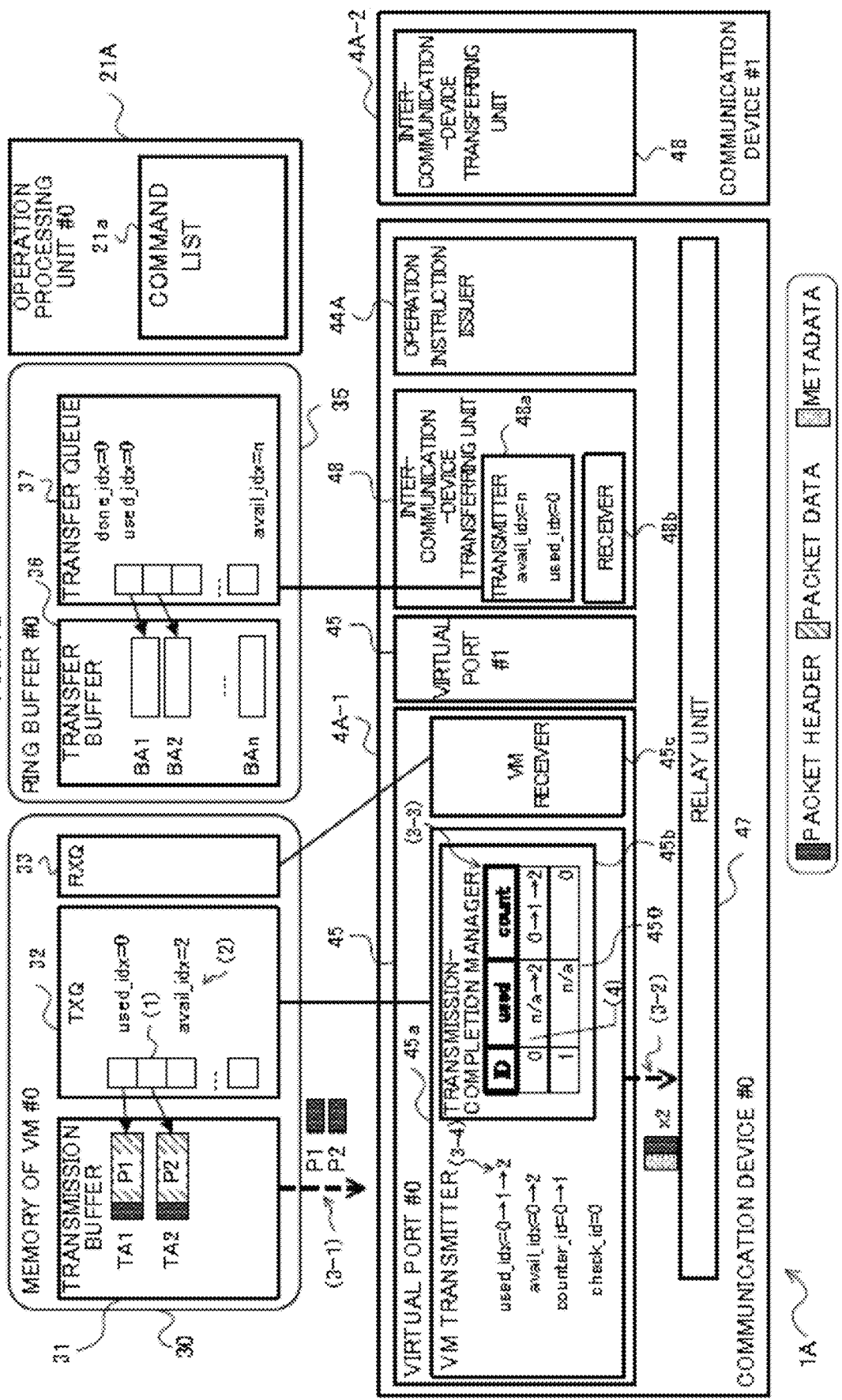
FIG. 18 is a diagram illustrating an example of an action of a data transferring process between VMs.
Figure 19:
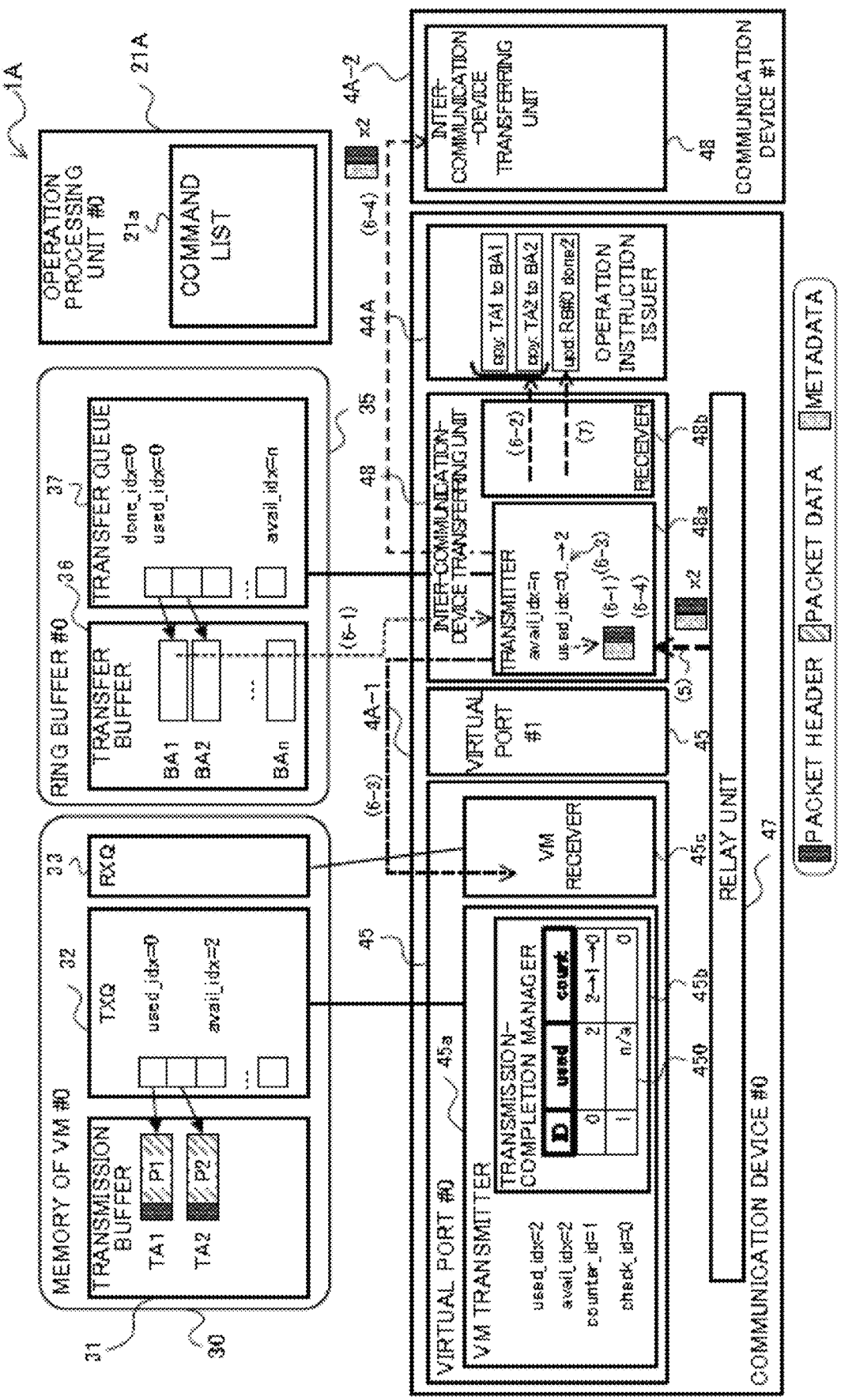
FIG. 19 is a diagram illustrating an example of an action of a data transferring process between the VMs.
Figure 20:
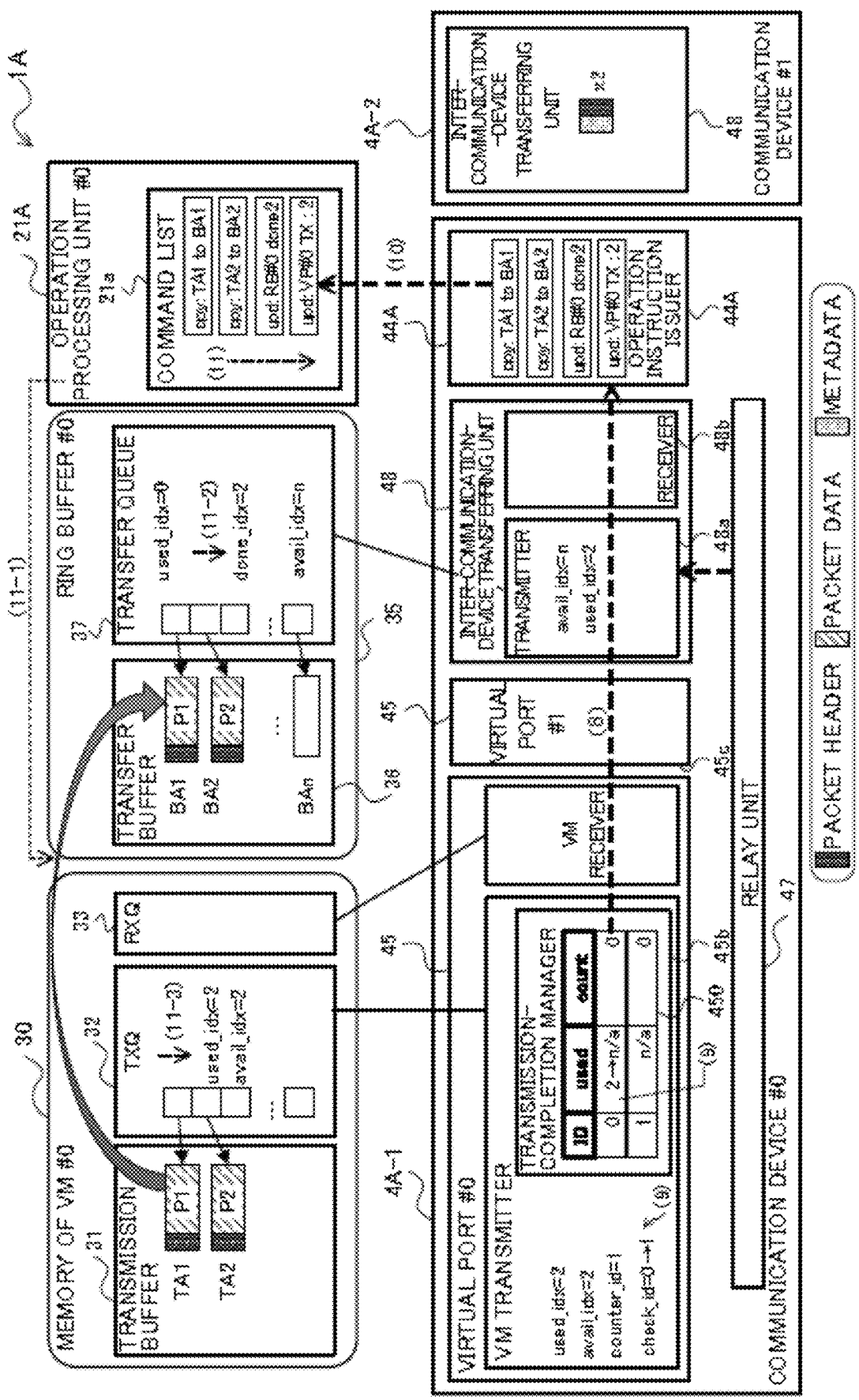
FIG. 20 is a diagram illustrating an example of an action of a data transferring process between the VMs.

[2-3] Example of Action of Data Transferring Process Between VMs:

Next, with reference to FIGS. 18 to 24, description will now be made in relation to an example of an action of a data transferring process by the communication device 4A in the server 1A illustrated in FIG. 13. FIGS. 18 to 24 are diagrams illustrating examples of an action of a data transferring process between the VMs. For example, FIGS. 18 to 20 are diagrams illustrating an example of an action of a first data transferring process from the source VM to the ring buffer 35, and FIGS. 21 to 24 are diagrams illustrating another example of an action of a second data transferring process from the ring buffer 35 to the destination VM.

The following description assumes a case where, like YES route in Step S22 in FIG. 17, data in the source memory 30 of the source VM #0 connected to the communication device #0 is transferred (transmitted) to the destination memory 30 of the destination VM #1 connected to communication device #1.

(Examples of Configuration of Server 1A)

First of all, description will now be made in relation to an example of the configuration of the server 1A illustrated in FIGS. 18 to 24. As illustrated in FIG. 18, the ring buffer 35 may include a transfer buffer 36 and a transfer queue 37, and the inter-communication-device transferring unit 48 may include a transmitter 48a and a receiver 48b.

The transfer queue 37 may be connected to the transmitter 48a of the inter-communication-device transferring unit 48 associated with the source VM. As illustrated in FIG. 18, the transfer queue 37 includes (stores) a done_idx in addition to the avail_idx and the used_idx.

The avail_idx is an index that notifies that a packet has been set in the transfer buffer 36. The used_idx is a process-completion index that notifies that the buffer indicated by the avail_idx has been used, and serves as an index for data transfer of a packet.

The done_idx is an index that notifies that data transfer by which entry in the used_idx has been completed, in other word, an index that notifies first copying completion has been finished by which packet. On the other hand, the used_idx in the ring buffer 35 is an index that indicates that the second copying is completed. The initial value of the done_idx may be "0". As the above, the done_idx is an example of a first copying process completion index, and the used_idx is an example of the second copying process completion index.

Like the VM transmitter 45*a*, the transmitter 48*a* of the inter-communication-device transferring unit 48 possesses the avail_idx, the used_idx, the counter_id, and the check_id. The receiver 48*b* of inter-communication-device transferring unit 48 possesses the done_idx, the used_idx, the counter_id, and the check_id. The indexes which the transmitter 48*a* and the receiver 48*b* possess are indexes similar to the those described above, but may be managed independently of one another in the TXQ 32, the RXQ 33, the ring buffer 35, the VM transmitter 45*a*, and the VM receiver 45*c*.

Figure 21:
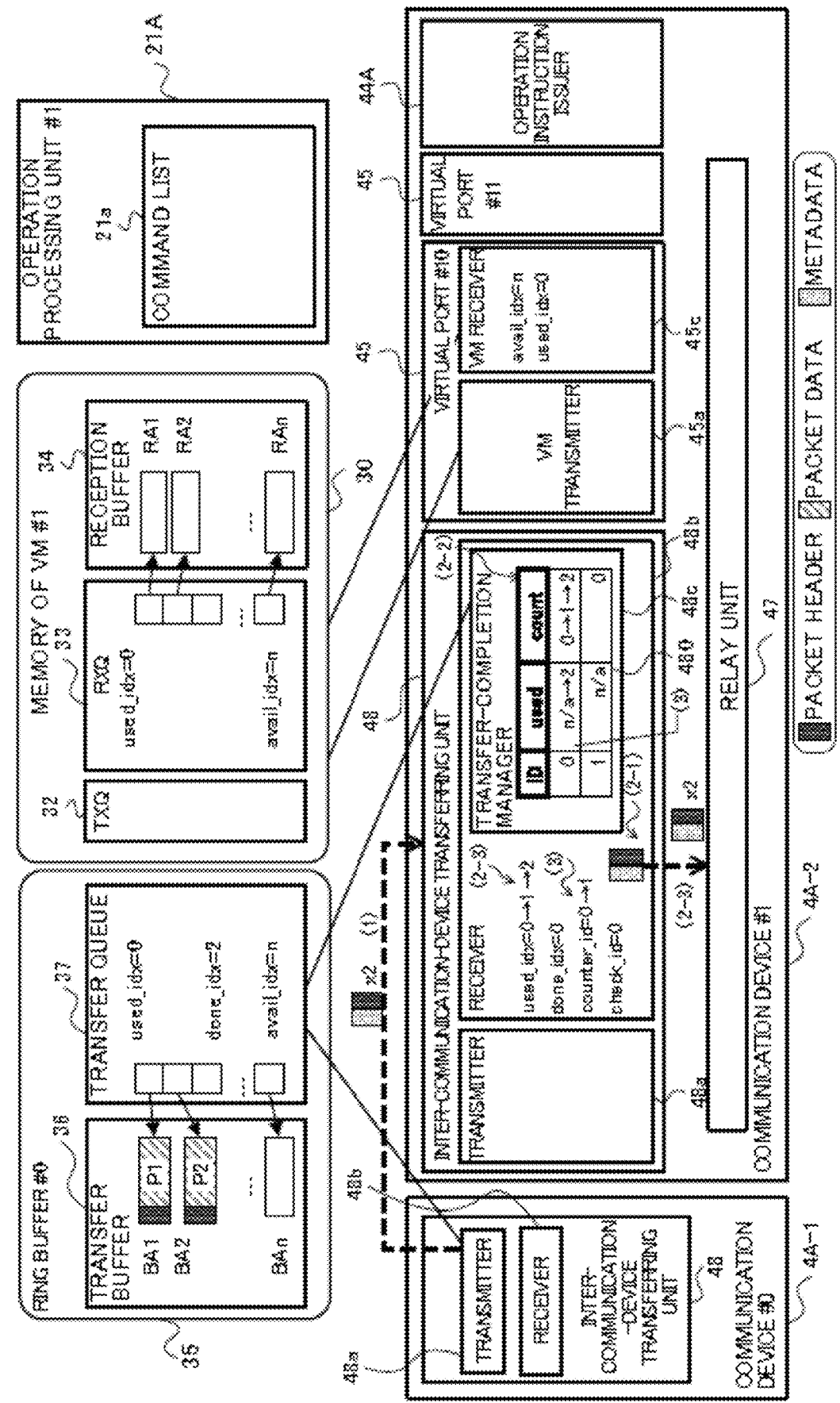
FIG. 21 is a diagram for explaining an exemplary action of data transferring process between the VMs.

As illustrated in FIG. 21, the receiver 48*b* may include a transfer-completion manager 48*c*. For example, the transfer-completion manager 48*c* manages the management table 480 and manages by which entry in the transfer queue 37 of the ring buffer 35 has been processed, using the management table 400.

Hereinafter, a case where the source VM #0 (processor 2) transmits two transmitting packets P1 and P2 to the virtual port #1 of the destination VM #1 is assumed.

(Example of Action of First Data Transferring Process)

First of all, description will now be made in relation to an example of an action of a first data transferring process that performs the first copying with reference to FIGS. 18 to 20. The processes of reference numbers (1) to (11-3) illustrated in FIGS. 18 to 20 may be the same as those of the reference numbers (1) to (11-3) illustrated in FIGS. 7 to 9, unless otherwise described.

As illustrated in FIG. 18, ring buffer #0 is assumed to have already set a transfer queue 37. For example, the ring buffer #0 may set n (where n is an integer equal to or larger than 2) empty buffers in the transfer buffer 36, and set reception buffer addresses BA1, BA2, BA3, . . . , BAn of the respective empty buffers in the transfer queue 37. In this case, the number "n" corresponding to the number of set BAs is set in the avail_idx of the ring buffer #0.

The transmitter 48*a* of the inter-communication-device transferring unit 48 sets, in the avail_idx, the number "n" the same as the avail_idx of the transfer queue 37.

As illustrated in FIG. 19, each of the packet headers attached with the metadata is transferred to the transmitter 48*a* of the inter-communication-device transferring unit 48 of the communication device #0 by the transferring process performed by the relay unit 47 (see the reference number (5)).

The transmitter 48*a* repeats the process illustrated in the following reference numbers (6-1) to (6-4) on data received from the relay unit 47 within a certain cycle. In the example of FIG. 19, the transmitter 48*a* performs processing on each of the packet headers attached with the metadata of the transmitting packets P1 to P2.

The transmitter 48*a* obtains a buffer address BA to be stored in the transfer queue 37 on the basis of the used_idx (initial value "0") possessed by the transmitter 48*a* (see the reference number (6-1)). For example, transmitter 48*a* may obtain BA1 for the first time and BA2 for the second time from Ring Buffer #0 in the repeating. The transmitter 48*a* also adds the value of used_idx to the metadata attached to the packet header.

On the basis of the obtained BA, and the TA and the packet size included in the metadata attached to the received packet header, the transmitter 48*a* issues a request for inter buffer data copying from the TA to the BA to the operation instruction issuer 44A (see the reference number (6-2)).

The transmitter 48*a* instructs an in-port (virtual port #0 in the example of FIG. 19) included in the metadata to decrement the count value corresponding to the counter_id of the VM transmitter 45*a* in the management table 450 of the transmission-completion manager 45*b* (see the reference number (6-3)). Further, the transmitter 48*a* increments the used_idx possessed by the transmitter 48*a*.

The transmitter 48*a* changes the transmission buffer address TAi of the metadata to the buffer address BAj of the transfer buffer 36 obtained in the reference number (6-1), and transfers the packet header attached with the metadata to the communication device #1 (see reference number (6-4)). The symbols i and j are integers from 1 to n.

As described above, the transmitter 48*a* repeats the process of the reference numbers (6-1) to (6-4) over the number of times the same as the number of received packet headers attached with the metadata. For example, through the process of the reference number (6-2), commands of "cpy: TA1 to BA1" and "cpy: TA2 to BA2" are stored, as commands for instruction for inter-buffer data copying from the TA to the BA, into the operation instruction buffer 44A.

Furthermore, through the processes of the reference numbers (6-3), the number "0" is set to the count value of the management table 450 of the virtual port #0, and the number "2" is set to the used_idx of the transmitter 48*a*. Further, by the process of the reference number (6-4), a packet header for transferring packet data from the ring buffer #0 serving as the relay buffer to the communication device #1 can be transmitted to the communication device #1.

In cases where the used_idx has been updated after the lapse of the certain cycle, the transmitter 48*a* issues a request that instructs to update the done_idx of the transfer queue 37 with the value of the used_idx after the updating to the operation instruction issuer 44A (see the reference number (7)). For example, as illustrated in FIG. 19, a command "upd: RB #0 done:2" is set in the operation instruction issuer 44A. This command is one for instructing the transfer queue 37 of the ring buffer #0 (RB #0) to update the used lax to "2".

As illustrated in FIG. 20, in the process of the reference numbers (11), the operation processing unit #0 stores the list of commands notified from the operation instruction issuer 44A into the command list 21*a*, and processes the commands from the top of the command list 21*a*.

For example, the operation processing unit #0 transfers the transmitting packets P1 and P2 from the TA1 and the TA2 of the transmission buffer 31 to the BA1 and the BA2 of the transfer buffer 36 by executing commands ("cpy: . . . ") that instructs the inter-buffer data copying (see the reference number (11-1)).

Furthermore, the operation processing unit 21A also updates the done_idx of the transfer queue 37 to "2" by executing a command ("upd: RB #0 done:2") that instructs to update the first copying process completion index (done_idx) of the transfer queue 37 of: the ring buffer #0 (see reference number (11-2)).

In addition, the operation processing unit 21A also updates the used_idx of the transmission buffer 31 of the source memory 30 connected to the virtual port #0 (VP #0) to "2" by executing a command ("upd: VP #0 TX:2") that instructs to update the process-completion index (used_idx) of the transmission buffer 31. (see the reference number 11-3).

This completes the first delta transferring process between the source VM and the ring buffer 35.

(Example of Action of Second Data Transferring Process)

Next, description will now be made in relation to an example of an action of a second data transferring process that performs the second copying with reference to FIGS. 21 to 24. The second data transferring process is a process on the side of the communication device #1, and may be executed independently from and also in parallel with the process of the reference numbers (6-4) (see FIG. 19) of the first data transferring process that is a process on the side of the communication device #0 and the processes subsequent thereto.

As illustrated in FIG. 21, the inter-communication-device transferring unit 48 (receiver 48b) of the communication device #1 receives the header data attached with the metadata from the inter-communication-device transferring unit 48 (transmitter 48a) of the communication device #0 (see the reference number (1)).

The receiver 48b of the communication device #0 repeats the process illustrated in the following reference numbers (2-1) to (2-3) on data received from the communication device #0 within a certain cycle. In the example of FIG. 21, the receiver 48b performs processing on each of the packet headers attached with the metadata of the transmitting packets P1 and P2.

The receiver 48b changes the in-port in the metadata to the PID (e.g. "0xff") of the inter-communication-device transferring unit 48, and changes the counter_id in the metadata to the value of the counter_id of the receiver 48b (see the reference number (2-1)).

The receiver 48b increments a count value of an entry indicated by the present counter_id in the management table 450 of the transfer-completion manager 48c (see the reference number (2-2)).

The receiver 48b increments the used_idx of the receiver 48b and transfers the header data attached with the metadata to the relay unit 47 (see the reference number (2-3)).

As described above, the receiver 48b repeats the process illustrated in the reference numbers (2-1) to (2-3) over the number of times as many as the number of data received from the communication device #0 within a certain cycle. Thereby, in the example of FIG. 21, the used_idx of the receiver 48b is set to "2", and the count value of the management table 480 of the transfer-completion manager 48c is set to "2".

The receiver 48b increments the used value of the management table 480 by the number as many as the number of times of repeating the process of the reference number (2) for increment of the counter_id of the receiver 48b (see the reference number (3)).

Here, the action to be performed on the transferring data between the communication devices 4A has already been decided in the relay unit 47 of the communication device #0 on the input side (see the reference number (3-2) of FIG. 38 and the reference number (5) of FIG. 19).

Figure 22:
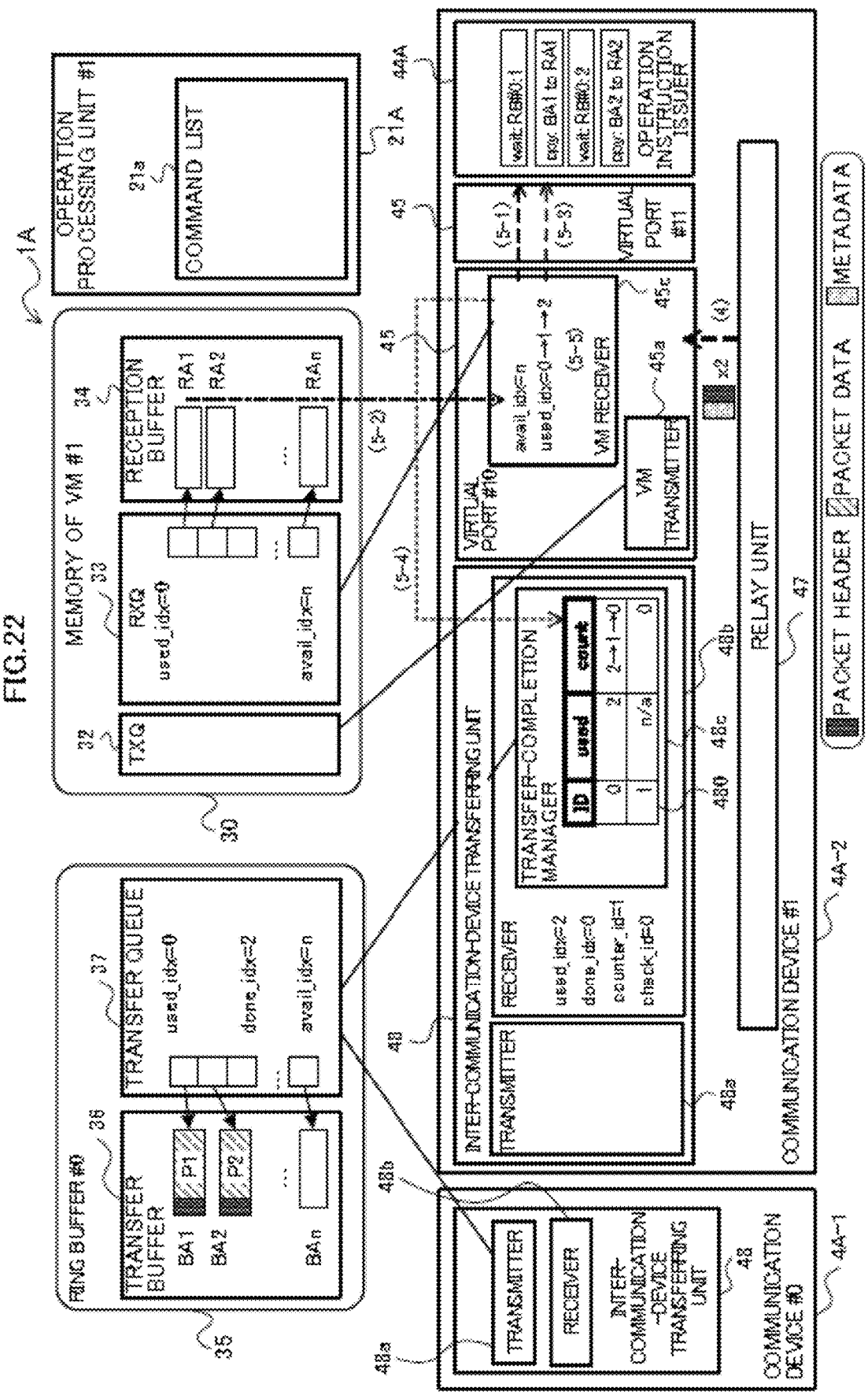
FIG. 22 is a diagram illustrating an example of an action of a data transferring process between the VMs.

For the above, as illustrated in FIG. 22, the relay unit 47 of the communication device #1 skips lookup and application of the action, and transfers the header data attached with the metadata to the destination port (see the reference number (4)). For example, the header data of packets P1 and P2 are transferred to the virtual port if #10.

The VM receiver 45c of the virtual port #10 repeats the process of the following reference numbers (5-1) to (5-5) on data received from the relay unit 47 within the certain cycle. In the example of FIG. 22, the VM receiver 45c performs processing on each of the packet headers attached with the metadata of the transmitting packets P1 and P2.

In cases where the in-port of the metadata attached to the received header data is inter-communication-device transferring unit 48, the VM receiver 45c issues a request for waiting for a done_idx to the operation instruction issuer 44A (see the reference number (5-1)). For example, on the basis of the used_id attached to the metadata in the reference number (6-1) in FIG. 19, the VM receiver 45c may issue "wait: RB #0: 1" for the first time (when used_idx=1) and "wait: RB #0: 2" for the second time (when used_idx=2) to the operation instruction issuer 44A.

The VM receiver 45c obtains a reception buffer address RA stored in the RXQ 33 of the VM #1 on the basis of the used_idx of the VM receiver 45c (see the reference number (5-2)). For example, the VM receiver 45c may obtain the RA1 for the first time and the RA2 for the second time from the VM #1 in the repeating.

The VM receiver 45c issues a request for inter-buffer data copying from the BA to the RA to the operation instruction issuer 44A on the basis of the transmission buffer address BAj and the packet size included in the metadata and on the basis of the obtained RA (see the reference number (5-3)).

The VM receiver 45c instructs an in-port (inter-communication-device transferring unit 48 in FIG. 22) included in the metadata to decrement the count value corresponding to the counter_id of the inter-communication-device transferring unit 48 in the management table 480 of the transfer-completion manager 48c (see the reference number (5-4)).

The VM receiver 45c increments the used_idx possessed by the VM receiver 45c (see the reference number (5-5)).

As described above, the VM receiver 45c repeats the process of the reference numbers (5-1) to (5-5) over the number of times the same as the number of received packet headers attached with the metadata. For example, through the process of the reference numbers (5-1) and (5-3), a command instructing to wait and a command instructing inter-buffer data copying from the BA to the RA are stored into the operation instruction buffer 44A. In the illustration in FIG. 22, commands of "wait: RB #0: 1", "cpy: BA1 to RA1", "wait: RB #0: 2", and "cpy: BA2 to RA2" are stored in the operation instruction issuer 44A.

Furthermore, through the process of the reference numbers (5-4) and (5-5), the number "0" is set to the count value of the management table 480 of the inter-communication device transferring unit 48 and the number "2" is set to the used_idx of the virtual port #10.

Figure 23:
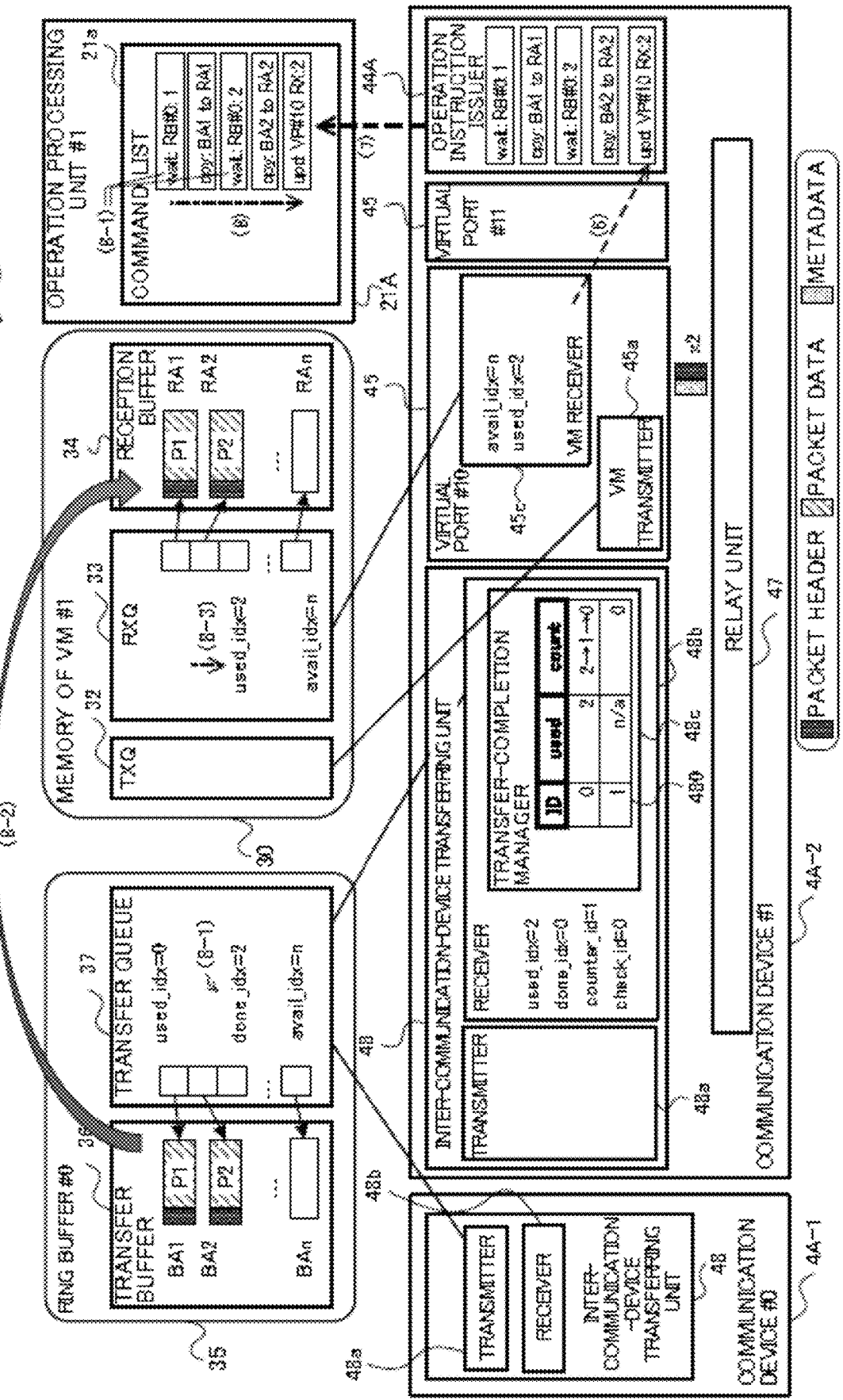
FIG. 23 is a diagram illustrating an example of an action of a data transferring process between the VMs.

As illustrated in FIG. 23, in cases where the used_idx has been updated after the lapse of the certain cycle, the VM receiver 45c of the virtual port #10 issues a request for updating the used_idx of the destination memory 30 to the operation instruction issuer 44A (see the reference number (6)). For example, as illustrated in FIG. 22, a command "upd: VP #10 RX:2" is set in the operation instruction issuer 44A. This command is one for instructing the RXQ 33 of the memory 30 (VM #1) connected to the virtual port #10 (VP #10) to update the used_idx to "2".

After a lapse of the certain cycle, the operation instruction issuer 44A notifies the operation processing unit #1 of a command (see the reference number (7)).

The operation processing unit #1 stores the list of commands notified from the operation instruction issuer 44A into the command list 21a, and processes the commands from the top of the command list 21a (see reference numbers (8)). For example, by executing a command ("wait: . . . ") that instructs waiting for the completion of the first copying, the operation processing unit #1 waits until the done_idx of the ring buffer 35 specified by the command reaches or exceeds the value specified by the command (see the reference number (8-1)).

Further, the operation processing unit #1 transfers the transmitting packets P1 and P2 from the BA1 and the BA2 of the transfer buffer 36 to the RA1 and the RA2 of the reception buffer 34 by executing a command ("cpy: . . . ") that instructs the inter-buffer data copying (see the reference number (8-2)).

Furthermore, the operation processing unit #1 also updates the used_idx of the reception buffer 34 to "2" by executing a command ("upd; VP #10 RX: 2") that instructs to update the process-completion index (used_idx) of the reception buffer 34 of the destination memory 30 (see the reference number 8-3).

Figure 24:
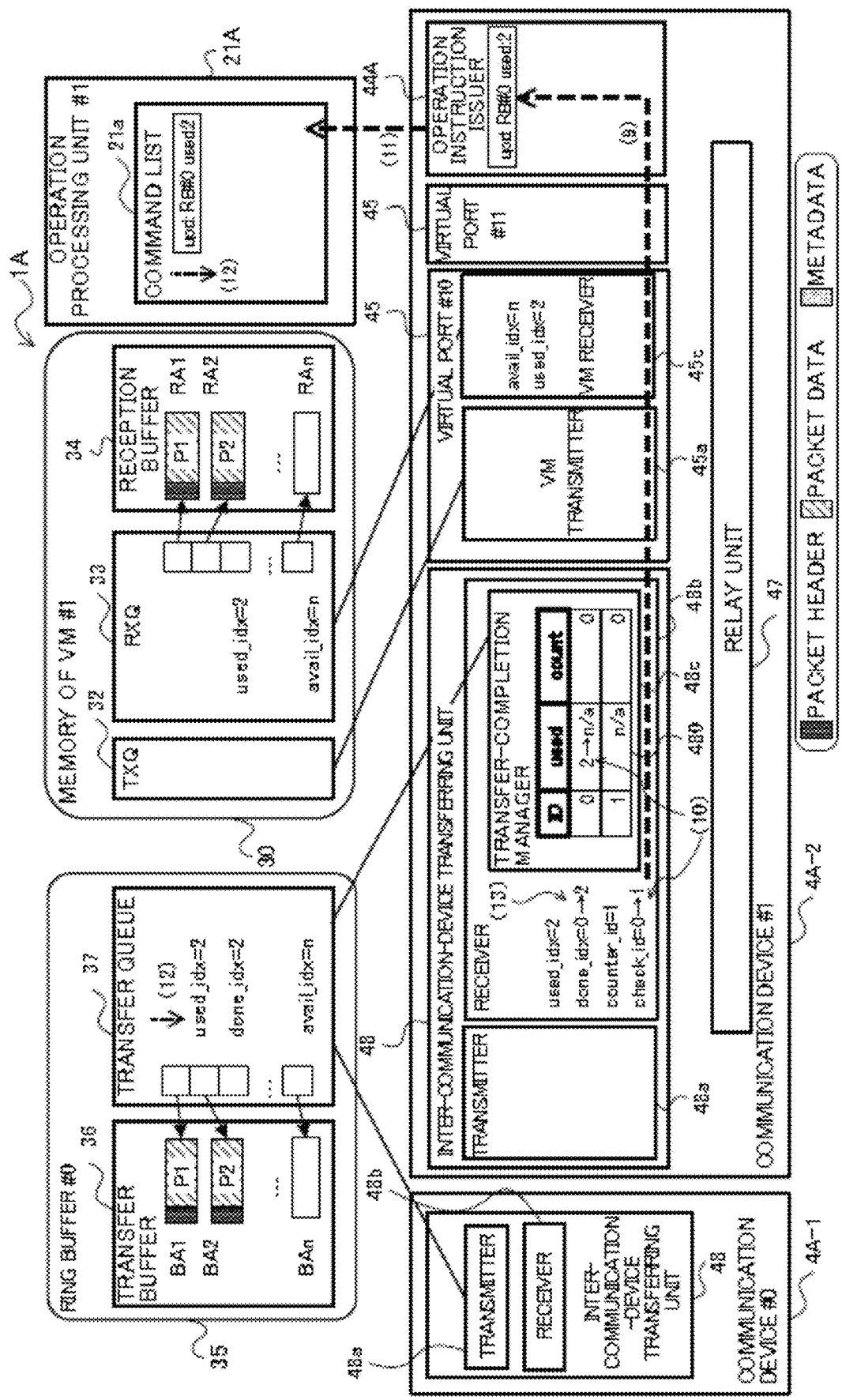
FIG. 24 is a diagram illustrating an example of an action of a data transferring process between the VMs.

As illustrated in FIG. 24, in cases where the count value of an entry in the management table 480 associated with the check_id comes to be "0", the receiver 48*b* of the inter-communication device transferring unit 4S of the communication device #1 issues a request for updating the used_idx of the ring buffer #0 to the operation instruction issuer 44A (see the reference number (9)). For example, as illustrated in FIG. 24, a command "upd; RB #0 used:2" is set in the operation instruction issuer 44A. The command is one for instructing the transfer queue 37 of the ring buffer #0 to update the used_idx to "2" which is the used value of the entry at the time when a count value comes to be "0" in management table 480.

The receiver 48*b* invalidates the used value of an entry whose count value in management table 480 has come to be "0" (by setting the value to "n/a", for example), and increments the check_id possessed by the receiver 43*b* (see the reference number (10)).

After the lapse of the certain cycle, the operation instruction issuer 44A notifies the operation processing unit #1 of a command (see the reference number (11)).

The operation processing unit #1 stores the list of commands notified from the operation instruction issuer 44A into the command list 21*a*, and processes the commands from the top of the command list 21*a* (see reference numbers (12)).

For example, the operation processing unit #1 updates the used_idx of the ring buffer #0 with the specified value by executing a command ("upd: RB #0 used:2"), and notifies the virtual switch controller 25 that the used transfer buffer 36 has become available.

The receiver 48*c* of the inter-communication-device transferring unit 48 of the communication device #1 periodically reads the done_idx of the associating ring buffer #0, and updates the done_idx possessed by the receiver 48*b* (see the reference number (13)). The done_idx possessed by the receiver 48*b* may be used to determine whether a packet has been copied to the transfer buffer BAj when the packet is being output from the physical port 46.

This completes the second data transferring process between the ring buffer 35 and the destination VM.

Since the first, and second data transferring processes using the ring buffer 35 described above can complete the process from inputting of data to updating of the transfer-ring-process-completion index within each communication device 4A, it is possible to suppress the delay in notification to release the transmission buffer 31. In addition, by waiting for the completion of the first copying, it is possible to guarantee the correct data copying from the source VM #0 to the destination VM #1. As the above, the method of the second embodiment makes it possible to apply the method of the first embodiment also to the data transferring between the communication devices 4A.

Moreover, even in cases where multiple offload devices exist, since the performance degradation of a transmission VM can be suppressed and turning back of the data on the I/O bus 1*b* can be reduced in data transfer between VMs in the same server 1A, occurrence of a bottleneck on the band of the I/O bus 1*b* can be avoided.

[3] Example of Hardware Configuration

Figure 25:
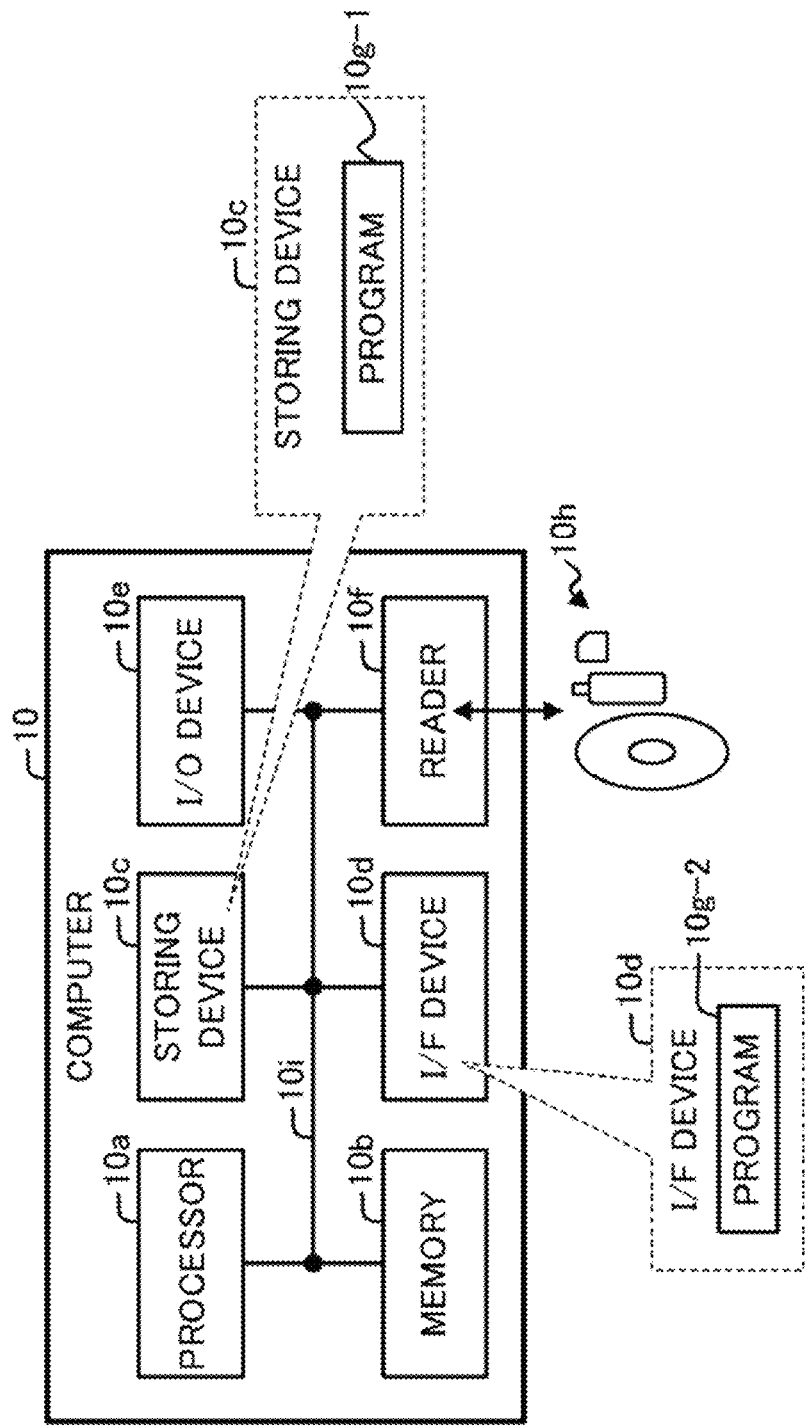
FIG. 25 is a block diagram schematically illustrating an example of the hardware (HW) configuration of a computer that achieves the function of the server.

FIG. 25 is a block diagram schematically illustrating an example of the hardware (HW) configuration of a computer 10 that achieves the functions of the servers 1 and 1A. If multiple computers are used as the HW resources for achieving the functions of the servers 1 and 1A, each of the computers may include the HW configuration illustrated in FIG. 25.

As illustrated in FIG. 25, the computer 10 may illustratively include a HW configuration formed of a processor 10*a*, a memory 10*b*, a storing device 10*c*, an I/F device 10*d*, an I/O device 10*e*, and a reader 10*f*.

The processor 10*a* is an example of an arithmetic operation processing device that performs various controls and calculations. The processor 10*a* may be communicably connected to the blocks in the computer 10 via a bus 10*i*. The processor 10*a* may be a multiprocessor including multiple processors, may be a multi core processor having multiple processor cores, or may have a configuration having multiple multicore processors. The processor 2 illustrated in FIGS. 3 to 5 and the processor 2A illustrated in FIGS. 14 to 16 are examples of the processor 10*a*.

The memory 10*b* is an example of a HW device that stores various types of data and information such as a program. Examples of the memory 10*b* include one or both of a volatile memory such as a Dynamic Random Access Memory (DRAM) and a non-volatile memory such as Persistent Memory (PM). The host memory 3 illustrated in FIGS. 3 to 5 and the host memory 3A illustrated in FIGS. 14 to 16 are examples of the memory 10*b*.

The storing device 10*c* is an example of a HW device that stores various types of data and information such as program. Examples of the storing device 10*c* include a magnetic disk device such as a Hard Disk Drive (HDD), a semiconductor drive device such as a Solid State Drive (SSD), and various storing devices such as a nonvolatile memory. Examples of the nonvolatile memory include a flash memory, a Storage Class Memory (SCM), and a Read Only Memory (ROM).

The storing device 10*c* may store a program 10*g*-1 that implements all or part of various functions of the computer 10. For example, the processors 10*a* of the servers 1 and 1A can achieve the functions of the operation processing unit 21 illustrated in FIGS. 3 and 4, the operation processing unit 21A illustrated in FIGS. 13, 14 and 16, the virtual switch controller 25 illustrated in FIG. 14, and the respective VMs by expanding the program 10*g*-1 stored in the storing device 10*c* onto the memory 10*b* and executing the expanded program 10*g*-1.

The I/F device 10*d* is an example of a communication IF that controls connection and communication with a network. For example, the I/F device 10*d* may include an applying adapter conforming to LAN such as Ethernet (registered trademark) or optical communication such as Fibre Channel (FC), and may be a communication device such as an NIC, The applying adapter may be compatible with one of or both wireless and wired communication schemes. For example, the servers 1 and 1A may be communicably connected to an external NW or an external I/F via the I/F device 10d.

The communication device 4 illustrated in FIGS. 3 to 5, the operation processing unit 21 illustrated in FIG. 5, the communication devices 4A illustrated in FIGS. 13 to 16, and the operation processing units 21A illustrated in FIG. 15 are examples of the I/F device 10d. For example, the I/F device 10d may include programmable logic circuitry, such as an FPGA, and a storing region, and as illustrated in FIG. 25, a program 10g-2 may be stored in the storing region thereof.

The I/F device 10d can achieve the function as the communication devices 4 and 4A by executing a program 10g-2 stored in the storing region by, for example, the FPGA. Further, the other I/F device 10d can achieve the functions as the operation processing units 21 and 21A and the virtual switch controller 25 by executing the program 10g-2 stored in the storing region by, for example, the FPGA.

For example, the programs 10g-1 and 10g-2 may be downloaded from the network to the computer 10 via the I/F device 10d, and then stored respectively in the storing regions of the storing device 10c and the I/F device 10d.

The functions of the server 1 of the first embodiment and the server 1A of the second embodiment may be achieved by at least a part of these programs 10g-1 and 10g-2. Therefore, at least a part of the programs 10g-1 and 10g-2 can be regarded as the information processing program.

The I/O device 10e may include one or both an input device and an output device. Examples of the input device include a keyboard, a mouse, and a touch panel. Examples of the output device include a monitor, a projector, and a printer.

The reader 10f is an example of a reader that reads data and programs recorded on a recording medium 10h. The reader 10f may include a connecting terminal or device to which the recording medium 10h can be connected or inserted. Examples of the reader 10f include an applying adapter conforming to, for example, Universal Serial Bus (USB), a drive apparatus that accesses a recording disk, and a card reader that accesses a flash memory such as an SD card. The programs 10g-3 and 10g-2 may be stored in the recording medium 10h. The reader 10f may read the programs 10g-1 and 10g-2 from the recording medium 10h and store the read programs 10g-1 and 10g-2 into the storing device 10c and the I/F device 10d.

The recording medium 10h is an example of a non-transitory computer-readable recording medium such as a magnetic/optical disk, and a flash memory. Examples of the magnetic/optical disk include a flexible disk, a Compact Disc (CD), a Digital Versatile Disc (DVD), a Blu-ray disk, and a Holographic Versatile Disc (HVD). Examples of the flash memory include a semiconductor memory such as a USB memory and an SD card.

The HW configuration of the computer 10 described above is exemplary. Accordingly, the computer 10 may appropriately undergo increase or decrease of HW devices (e.g., addition or deletion of arbitrary blocks), division, integration in an arbitrary combination, and addition or deletion of the bus. For example, in each of the servers 1 and 1A, at least one of the I/O device 10e and the reader 10f may be omitted.

[4] Miscellaneous

The technique according to the first and second embodiments described above can be changed or modified as fellows.

For example, the blocks included in the server 1 illustrated in FIG. 3 may be merged in any combination or each be divided respectively. Further, the blocks illustrated in FIGS. 7 to 10 may be merged in any combination or may each be divided. Furthermore, for example, blocks included in the server 1A illustrated in FIG. 13 may be merged in any combination or may each be divided. Further, the blocks illustrated in FIGS. 18 to 24 may be merged in any combination or may each be divided.

Further, the description of the first embodiment assumes a case where the server 1 includes a single communication device 4, but the configuration of the server 1 is by no means limited to this. Alternatively, the server 1 may include multiple communication devices 4 because the input/output ports can be discriminated from one another with the PIDs in units of communication device. Further, the description of the second embodiment assumes a case where the server 1A includes two communication devices 4A, but the configuration of the server 1A is by no means limited to this. Alternatively, the server 1A may include multiple (e.g. three or more) communication devices 4A because the input/output ports can be discriminated from one another with the PIDs in units of communication device.

In one aspect, it is possible to reduce the workload on an I/O bus between a processing apparatus that runs multiple virtual machines and a relay device that performs a relaying process, serving as a virtual switch that connects the virtual machines to one another.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory comprising a first storing region allocated to a first virtual machine and a second storing region allocated to a second virtual machine;
a processor that is connected to the memory via a memory bus and configured to execute the first virtual machine and the second virtual machine;
a Network Interface Controller (NIC) that is connected to the processor via an input and output (IO) bus and configured to execute a relaying process, serving as a virtual switch that connects the first virtual machine to the second virtual machine; and
a transfer processor configured to transfer data in the memory by utilizing the processor,
wherein the NIC:
at a first virtual port connected to the first virtual machine:
obtains, from the first storing region, a fragment data included in first data to be transmitted stored in the first storing region, the fragment data indicating a destination of the first data, the first data including the fragment data and payload data, and
executes, in a case where the destination of the fragment data is the second storing region, the relaying process relaying the fragment data to a second virtual port connected to the second virtual machine, at the second virtual port:
suppresses passing of the payload data through the IO bus by outputting an instruction instructing the transfer processor to transfer, inside the memory, the first data from the first storing region to the second storing region to the transfer processor, and wherein the transfer processor transfers, inside the memory, the first data from the first storing region to the second storing region bypassing the NIC in response to the instruction.

2. The information processing apparatus according to claim 1, wherein the NIC:

at the first virtual port:
attaches, to the fragment data, second data including a storing address of the first data in the first storing region and a data size of the first data,
executes the relaying process on the fragment data attached with the second data, and at the second virtual port serving as an output destination of the relaying process,
generates the instruction, based on the second data attached to the fragment data.

3. The information processing apparatus according to claim 1, wherein:

the first storing region stores a storage number of one or more of the first data being stored and a transferring number of first data having been transferred to destinations among one or more first data;

the transfer processor updates, upon transferring each of the one or more first data, the transferring number; and the processor manages, based on the storage number and the transferring number, a holding region that stores the one or more first data in the first storing region to be releasable in execution of the first virtual machine associated with the first storing region.

4. The information processing apparatus according to claim 1, wherein:

the second storing region stores a number of storage regions to store one or more of the first data having been received and a receiving number of one or more first data having been received;

the transfer processor updates, upon transferring each of the one or more first data, the receiving number; and the processor manages, based on the number of storage regions and the receiving number, one or more of the storage regions in the second storing region to be releasable in execution of the second virtual machine associated with the second storing region.

5. The information processing apparatus according to claim 1, wherein:

the NIC comprises a physical port connected to an interface that communicates with an external entity to the information processing apparatus; and in a case where the destination of the fragment data is the external entity, the physical port obtains the payload data in the first data from the first storing region, and outputs the first data obtained by combining the fragment data and the payload data to the interface.

6. The information processing apparatus according to claim 1, wherein:

the NIC comprises:
a first NIC associated with the first storing region, and
a second NIC associated with the second storing region;

the transfer processor comprises:
a first transfer processor associated with the first NIC, and
a second transfer processor associated with the second NIC;

the memory comprises a third storing region that is used for transferring of data;

the first NIC outputs a first instruction instructing the first transfer processor to perform first transfer on the first data from the first storing region to the third storing region, to the first transfer processor;

the first transfer processor executes, in response to the first instruction of the first transfer, a first transferring process that transfers the first data from the first storing region to the third storing region by utilizing the processor;

the second NIC outputs a second instruction instructing the second transfer processor to perform second transfer of the first data from the third storing region to the second storing region, to the second transfer processor; and the second transfer processor executes a second transferring process that transfers the first data from the third storing region to the second storing region by utilizing the processor in response to the second instruction and completion of the first transferring process.

7. The information processing apparatus according to claim 6, wherein the first NIC transmits completion notification of the first transferring process to the first virtual port of a transmission source of the first data in response to the first instruction.

8. The information processing apparatus according to claim 6, wherein the first NIC:

attaches, to the fragment data, second data including a storing address of the first data in the first storing region and a data size of the first data, and changes, in transferring the fragment data to the second NIC when performing the relaying process on the fragment data attached with the second data, the storing address included in the second data attached to the fragment data to an address of the third storing region; and the second NIC generates the second instruction based on the second data attached to the fragment data.

9. The information processing apparatus according to claim 6, wherein the second instruction is an instruction to start the second transfer after the first transferring process is completed.

10. The information processing apparatus according to claim 1, wherein the transfer processor is included in the processor.

11. The information processing apparatus according to claim 1, wherein
the transfer processor is connected to the processor through a second IO bus different from the IO bus.

12. A non-transitory computer-readable recording medium having stored therein an information processing program that instructs a computer to execute a process, the computer comprising a memory comprising a first storing region allocated to a first virtual machine and a second storing region allocated to a second virtual machine, a processor that is connected to the memory via a memory bus and configured to execute the first virtual machine and the second virtual machine, and a Network Interface Controller (NIC) that is connected to the processor via an input and output (IO) bus and configured to execute a relaying process, serving as a virtual switch that connects the first virtual machine to the second virtual machine, the process comprising:

at a first virtual port being included in the NIC and being connected to the first virtual machine:
obtaining, from the first storing region, a fragment data included in first data to be transmitted stored in the first storing region, the fragment data indicating a destination of the first data, the first data including the fragment data and payload data;
executing, in a case where the destination of the fragment data is the second storing region, the relaying process relaying the fragment data to a second virtual port being included in the NIC and being connected to the second virtual machine,
at the second virtual port:
suppressing passing of the payload data through the IO bus by outputting an instruction instructing to transfer, inside the memory, the first data from the first storing region to the second storing region, and
at a transfer processor configured to transfer data in the memory by utilizing the processor, transferring, inside the memory, the first data from the first storing region to the second storing region bypassing the NIC, in response to the instruction.

13. The non-transitory computer-readable recording medium according to claim 12, the process further comprising:
at the first virtual port of the NIC:
attaching, to the fragment data, second data including a storing address of the first data in the first storing region and a data size of the first data,
executing the relaying process on the fragment data attached with the second data, and at the second virtual port serving as an output destination of the relaying process,
generating the instruction, based on the second data attached to the fragment data.

14. The non-transitory computer-readable recording medium according to claim 12, wherein
the first storing region stores a storage number of one or more of the first data being stored and a transferring number of first data having been transferred to destinations among one or more first data;
the process further comprising:
at the transfer processor:
updating, upon transferring each of the one or more first data, the transferring number; and
at the processor:
managing, based on the storage number and the transferring number, a holding region that stores the one or more first data in the first storing region to be releasable in execution of the first virtual machine associated with the first storing region.

15. The non-transitory computer-readable recording medium according to claim 12, wherein
the second storing region stores a number of storage regions to store one or more of the first data having been received and a receiving number of one or more first data having been received;

the process further comprising:
at the transfer processor,
updating, upon transferring each of the one or more first data, the receiving number; and
at the processor,
managing, based on the number of storage regions and the receiving number, one or more of the storage regions in the second storing region to be releasable in execution of the second virtual machine associated with the second storing region.

16. The non-transitory computer-readable recording medium according to claim 12, the process further comprising:
at the NIC,
in a case where the destination of the fragment data is an external entity to the computer, obtaining the payload data in the first data from the first storing region at a physical port being connected to an interface that communicates with the external entity, and outputting the first data obtained by combining the fragment data and the payload data to the interface.

17. The non-transitory computer-readable recording medium according to claim 12, wherein:
the NIC comprises:
a first NIC associated with the first storing region, and
a second NIC associated with the second storing region;
the transfer processor comprises:
a first transfer processor associated with the first NIC, and
a second transfer processor associated with the second NIC;
the memory comprises a third storing region that is used for transferring of data;
the process further comprises:
at the first NIC, outputting a first instruction instructing the first transfer processor to perform first transfer on the first data from the first storing region to the third storing region, to the first transfer processor;
at the first transfer processor, executing, in response to the first instruction, a first transferring process that transfers the first data from the first storing region to the third storing region by utilizing the processor;
at the second NIC, outputting a second instruction instructing the second transfer processor to perform second transfer on the first data from the third storing region to the second storing region, to the second transfer processor; and
at the second transfer processor, executing a second transferring process that transfers the first data from the third storing region to the second storing region by utilizing the processor in response to the second instruction and completion of the first transferring process.

18. A method of processing information executed by a computer comprising a memory comprising a first storing region allocated to a first virtual machine and a second storing region allocated to a second virtual machine, a processor that is connected to the memory via a memory bus and configured to execute the first virtual machine and the second virtual machine, and a Network Interface Controller (NIC) that is connected to the processor via an input and output (IO) bus and configured to execute a relaying process, serving as a virtual switch that connects the first virtual machine to the second virtual machine, the method comprising:
at a first virtual port being included in the NIC and being connected to the first virtual machine:

obtaining, from the first storing region, a fragment data included in first data to be transmitted stored in the first storing region, the fragment data indicating a destination of the first data, the first data including the fragment data and payload data;

executing, in a case where the destination of the fragment data is the second storing region, the relaying process relaying the fragment data to a second virtual port being included in the NIC and being connected to the second virtual machine, at the second virtual port:

suppressing passage of the payload data through the IO bus by outputting an instruction instructing to transfer, inside the memory, the first data from the first storing region to the second storing region and at a transfer processor configured to transfer data in the memory by utilizing the processor, transferring, inside the memory, the first data from the first storing region to the second storing region bypassing the NIC, in response to the instruction.

19. The method according to claim 18, further comprising:

at the first virtual port of the NIC:

attaching, to the fragment data, second data including a storing address of the first data in the first storing region and a data size of the first data, executing the relaying process on the fragment data attached with the second data, and at the second virtual port serving as an output destination of the relaying process, generating the instruction, based on the second data attached to the fragment data.

20. The method according to claim 18, wherein
the NIC comprises:
a first NIC associated with the first storing region, and
a second NIC associated with the second storing region;
the transfer processor comprises:
a first transfer processor associated with the first NIC, and
a second transfer processor associated with the second NIC;
the memory comprises a third storing region that is used for transferring of data;
the method further comprises:
at the first NIC, outputting a first instruction instructing the first transfer processor to perform first transfer on the first data from the first storing region to the third storing region, to the first transfer processor;
at the first transfer processor, executing, in response to the first instruction, the first transferring process that transfers the first data from the first storing region to the third storing region by utilizing the processor;
at the second NIC, outputting a second instruction instructing the second transfer processor to perform second transfer on the first data from the third storing region to the second storing region, to the second transfer processor; and
at the second transfer processor executing the second transferring process that transfers the first data from the third storing region to the second storing by utilizing the processor in response to the second instruction and completion of the first transferring process.

* * * * *